US012656609B2

(12) United States Patent
Sheng et al.

(10) Patent No.: US 12,656,609 B2
(45) Date of Patent: *Jun. 16, 2026

(54) COMPACT NEAR EYE DISPLAY ENGINE

(71) Applicant: TEXAS INSTRUMENTS INCORPORATED, Dallas, TX (US)

(72) Inventors: Zhongyan Sheng, Allen, TX (US); Xi Zhou, Plano, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 19/020,460

(22) Filed: Jan. 14, 2025

(65) Prior Publication Data

US 2025/0147310 A1 May 8, 2025

Related U.S. Application Data

(63) Continuation of application No. 18/295,048, filed on Apr. 3, 2023, now Pat. No. 12,242,056, which is a continuation-in-part of application No. 17/890,107, filed on Aug. 17, 2022, now Pat. No. 12,164,110.

(60) Provisional application No. 63/330,153, filed on Apr. 12, 2022, provisional application No. 63/233,856, filed on Aug. 17, 2021.

(51) Int. Cl.
| | |
|---|---|
| *G02B 5/04* | (2006.01) |
| *G02B 3/00* | (2006.01) |
| *G02B 27/01* | (2006.01) |
| *G02B 27/09* | (2006.01) |
| *G02B 27/10* | (2006.01) |

(52) U.S. Cl.
CPC ......... *G02B 27/017* (2013.01); *G02B 3/0075* (2013.01); *G02B 5/04* (2013.01); *G02B 27/0922* (2013.01); *G02B 27/102* (2013.01); *G02B 2027/0178* (2013.01); *G02B 2027/0185* (2013.01)

(58) Field of Classification Search
CPC ...... G02B 27/017; G02B 3/0075; G02B 5/04; G02B 27/0922; G02B 27/102; G02B 2027/0178; G02B 2027/0185
See application file for complete search history.

(56) References Cited

U.S. PATENT DOCUMENTS

| | | | |
|---|---|---|---|
| 5,984,477 A | * | 11/1999 | Weissman .......... G02B 27/0172 |
| | | | 359/630 |
| 2011/0285968 A1 | | 11/2011 | Huang |
| 2014/0177023 A1 | | 6/2014 | Gao |
| 2016/0011419 A1 | | 1/2016 | Gao |
| 2017/0102545 A1 | | 4/2017 | Hua |

(Continued)

OTHER PUBLICATIONS

Huang, Y., et al., "High Contrast Ratio and Compact-Sized Prism for DLP Projection System," Optics Express, vol. 22, No. 14, Jul. 3, 2014, 14 pages.

*Primary Examiner* — Afroza Chowdhury
(74) *Attorney, Agent, or Firm* — Michael T. Gabrik; Frank D. Cimino

(57) ABSTRACT

An apparatus an apparatus includes a light source and freeform optics optically coupled to the light source. The apparatus also includes a spatial light modulator (SLM) optically coupled to the freeform optics and a prism optically coupled between the freeform optics and the SLM. Additionally, the apparatus includes eyepiece optics optically coupled to the prism.

16 Claims, 19 Drawing Sheets

(56)        References Cited

U.S. PATENT DOCUMENTS

| | | | |
|---|---|---|---|
| 2018/0081322 A1* | 3/2018 | Robbins | G03H 1/2294 |
| 2018/0136471 A1 | 5/2018 | Miller | |
| 2018/0292655 A1* | 10/2018 | Smithwick | G06T 19/00 |
| 2019/0107722 A1 | 4/2019 | Gao | |
| 2019/0258073 A1 | 8/2019 | Sissom | |
| 2019/0293939 A1* | 9/2019 | Sluka | G02B 27/0172 |
| 2020/0393676 A1 | 12/2020 | Hua | |
| 2021/0072543 A1 | 3/2021 | Peng | |
| 2022/0279151 A1* | 9/2022 | Bates | G02B 17/04 |

* cited by examiner

COMPACT NEAR EYE DISPLAY ENGINE

CROSS-REFERENCE TO RELATED APPLICATIONS

The present application is a continuation of U.S. Non-Provisional patent application Ser. No. 18/295,048 filed Apr. 3, 2023, which is a continuation-in-part of U.S. Non-Provisional application Ser. No. 17/890,107 filed Aug. 17, 2022, which claims priority to U.S. Provisional Patent Application No. 63/330,153 filed Apr. 12, 2022, and U.S. Provisional Patent Application No. 63/233,856 filed Aug. 17, 2021, which applications are hereby incorporated herein by reference in their entireties.

BACKGROUND

Projection-based displays project images onto projection surfaces, such as onto a wall or a screen, to display video or pictures for viewing. Such displays can include cathode-ray tube (CRT) displays, liquid crystal displays (LCDs), and digital mirror device (DMD) displays, etc. Projection-based displays include near-eye displays for projecting image through the eye pupil on the retina, such as augmented reality (AR) or virtual reality (VR) displays in wearable devices.

SUMMARY

In accordance with at least one example of the disclosure, an apparatus includes a light source and freeform optics optically coupled to the light source. The apparatus also includes a spatial light modulator (SLM) optically coupled to the freeform optics and a prism optically coupled between the freeform optics and the SLM. Additionally, the apparatus includes eyepiece optics optically coupled to the prism.

In accordance with at least one example of the disclosure, an apparatus includes a light source array and a lens array optically coupled to the light source array. The apparatus also includes a spatial light modulator (SLM) optically coupled to the lens array and a prism optically coupled between the lens array and the SLM. Additionally, the apparatus includes eyepiece optics optically coupled to the prism.

In accordance with at least one example of the disclosure, a wearable device includes a light source configured and a prism. The wearable device also includes freeform optics optically coupled between the light source and the prism and optical elements optically coupled to the prism. Additionally, the wearable device includes a spatial light modulator (SLM) optically coupled to the prism and an optical combiner optically coupled to the optical elements.

DETAILED DESCRIPTION

Figure 1A:
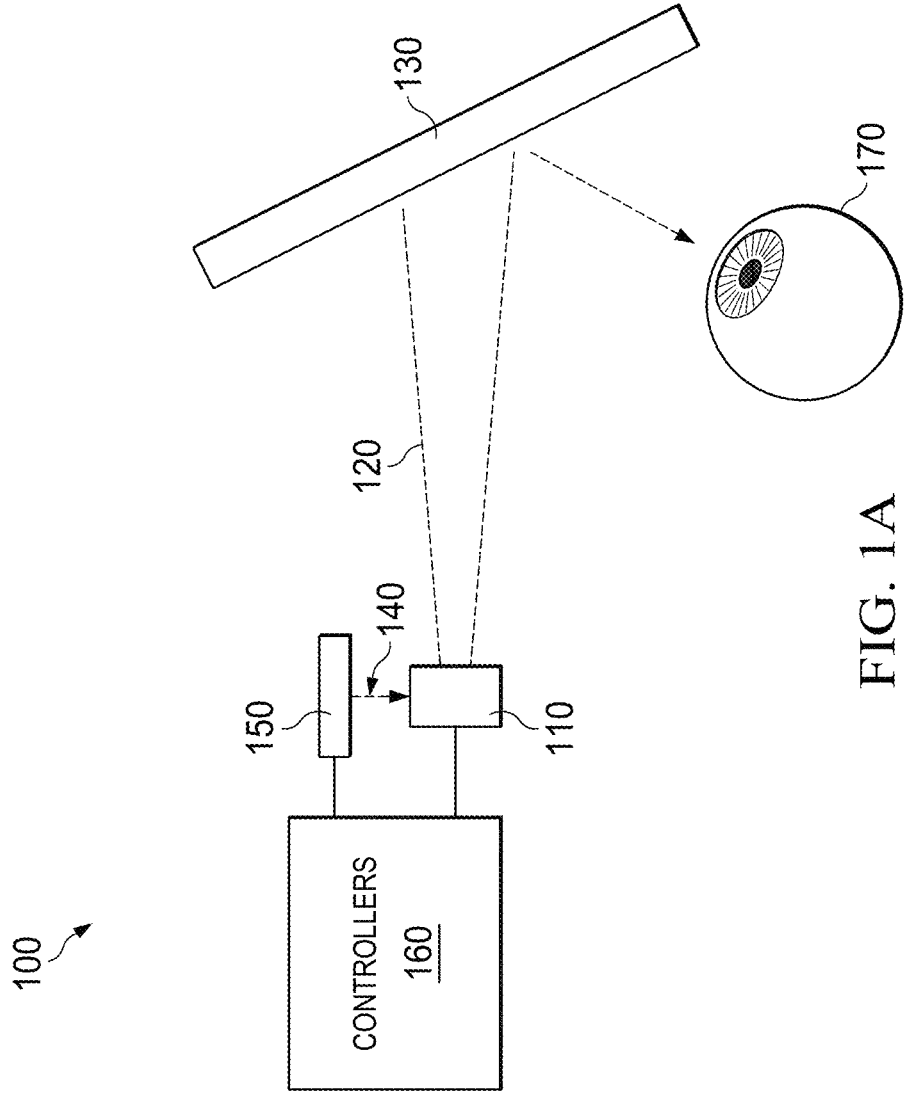
FIG. 1A is a diagram of a near eye display, in accordance with various examples.

Projection-based displays for near-eye projection, also referred to herein as near eye displays, include wearable devices, such as AR glasses and VR headsets, also referred to herein as AR/VR glasses. Wearable devices including AR/VR glasses can be useful in applications such as gaming, entertainment, education, healthcare, training, exploration, and other applications. Such devices are designed with compact and lightweight requirements. The compact devices can include light sources and modulators with compact design, such as with micro-light emitting diodes (micro-LEDs), micro-organic light emitting diodes (micro-OLEDs), and SLMs.

SLMs for projection-based displays include micro-electromechanical system (MEMS) based SLMs such as digital mirror devices (DMDs), where the optical elements for modulating light are micromirrors. SLMs can also include liquid crystal based SLMs, such as liquid crystal displays (LCD), liquid crystal on silicon (LCoS) and ferroelectric liquid crystal on silicon (FLCoS), where the optical elements for modulating light are liquid crystals. SLMs can also include micro-LEDs. The intensity of the projected light is modulated by controlling the optical elements to manipulate the light and accordingly form the pixels of a displayed image. For example, the optical elements of a DMD are adjustable tilting micromirrors which are tilted by applying voltages to the micromirrors through respective electrodes. The micromirrors are tilted to project dark pixels, bright pixels, or shades of light per pixel. In liquid crystal based SLMs, the liquid crystals are controlled by voltage to modulate the intensity of light across the image pixels. For example, an LCOS or FLCOS includes an array of liquid crystals of cells of liquid crystals on a reflective layer, which are controlled to reflect and modulate the intensity of light in the image pixels. The intensity of light is modulated by applying voltage to the liquid crystals to reorient the crystals and accordingly control the amount of light projected per pixel. For example, a voltage can be applied, through respective electrodes, to each cell which adjusts the amount of light projected by the liquid crystals in the cell.

This description includes examples of apparatuses that are useful to reduce the size and weight of near eye displays, including wearable devices such as AR/VR glasses. The apparatuses, also referred to herein as a near eye display engines, have compact designs and include optical components that optically couple light sources to an SLM. The near eye display includes a pair of prisms with different sides that are optically coupled to the SLM, the light sources, and focusing optics, respectively. The prisms are adjacent or coupled to each other, such as in contact with each other or separated by a beam splitter. The pair of prisms direct light with multiple color modes from the light sources on a first side of the prisms to the SLM on a second side of the prisms, and direct the modulated light from the SLM on the second side to the focusing optics on a third side of the prisms. The pair of prisms also direct the focused modulated light from the focusing optics on the third side towards a projection surface optically coupled to a fourth side of the prisms. The pair of prisms can be coupled to the light source on the first side by an optical waveguide coupler which includes multiple reflector surfaces configured to uniformly distribute the color modes on the SLM. Increasing the reflector surfaces in the optical waveguide coupler can increase the uniform distribution of the color modes on the SLM, which increases projected image quality.

Figure 1B:
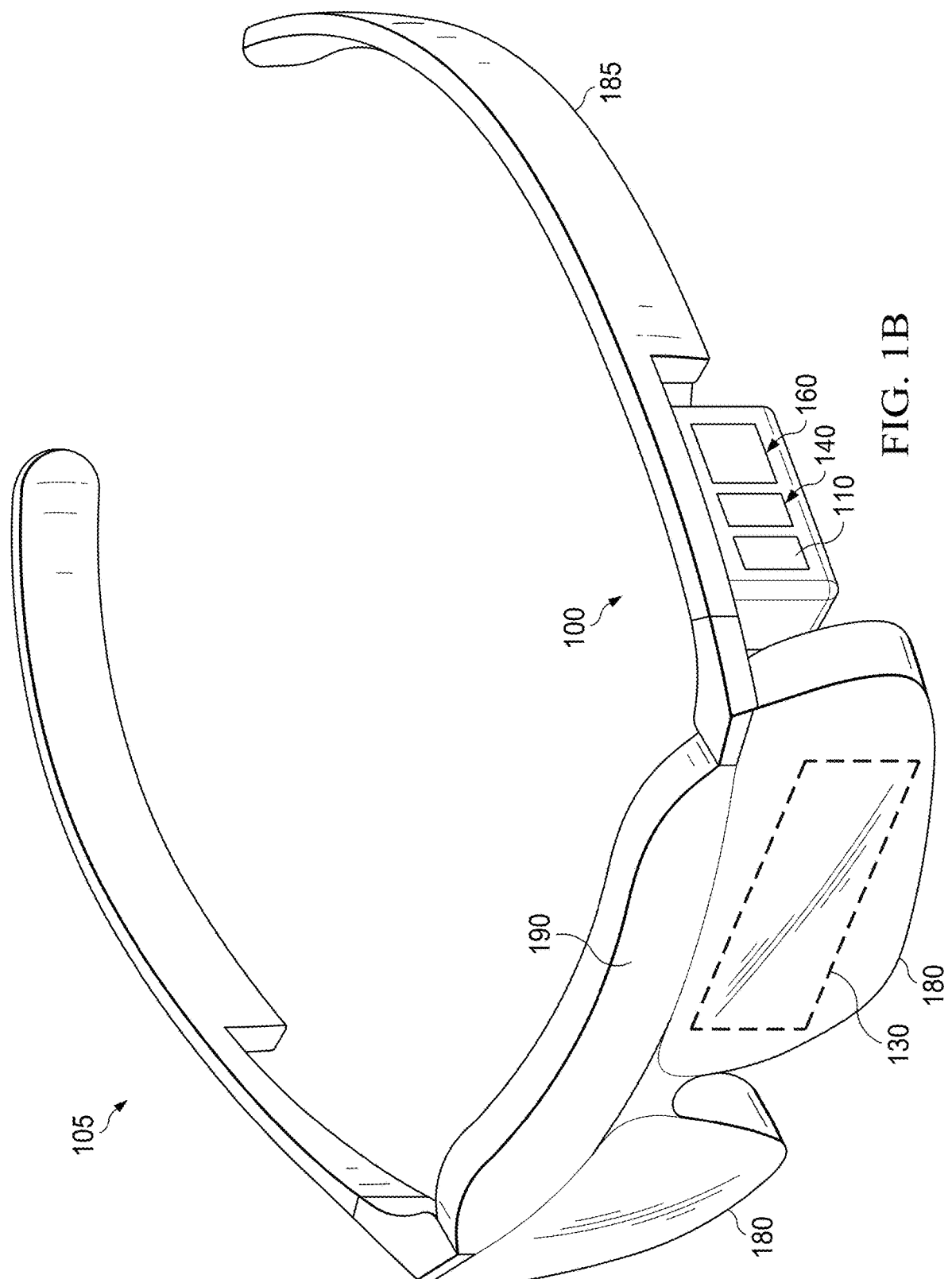
FIG. 1B is a diagram of a wearable device including the near eye display of FIG. 1A, in accordance with various examples.

FIG. 1A and FIG. 1B are diagrams of a near eye display 100 and a wearable device 105, respectively, in accordance with various examples. The near eye display 100 is a projection-based display system to display an image for near eye viewing. The near eye display 100 is part of the wearable device 105. For example, the wearable device 105 is AR/VR glasses, as shown in FIG. 1B. The modulated light 120 may be modulated by an SLM in a near eye display engine 110 to project still images or moving images, such as video, onto eye retina through an optical combiner 130. The optical combiner 130 is a transparent optical surface, which can be formed from a dielectric material (e.g., glass or optical plastic), that reflects the projected modulated light 120 and allows the transmission of natural light in front of a human eye 170. The modulated light 120 can be formed as a combination of color modes (e.g., blue, green, and red) from an incident light 140, which is generated by one or more light sources 150. The color modes in the incident light 140 can be transmitted simultaneously or by time multiplexing the one or more light sources 150. The incident light 140 with the different color modes is modulated by the SLM in the near eye display engine 110 to produce the modulated light 120 for displaying images or video on the retina of the human eye 170 through the optical combiner 130.

The near eye display 100 also includes one or more controllers 160 coupled to the SLM in the near eye display engine 110 and to the one or more light sources 150 for controlling the two components to display the images or video. For example, the one or more controllers 160 can include a first controller (not shown) for controlling the SLM in the near eye display engine 110 to modulate the incident light 140 including the color modes from the respective light sources 150. The one or more controllers 160 can also include a second controller (not shown) for controlling the one or more light sources 150 to transmit the incident light 140 simultaneously or by time multiplexing. The controllers 160 can also include a processor configured to process an image for display and produce a processed image. The processed image can be a digital image, which is useful to provide control signals from the controllers 160 to the SLM in the near eye display engine 110 and the one or more light sources 150.

The SLM of the near eye display engine 110 is configured to project the modulated light 120 onto the optical combiner 130 to display an image for viewing by the human eye 170, also referred to herein as the eye pupil. As shown in FIG. 1B, the optical combiner 130 can be located on a respective lens 180 which represents a near eye see-through screen of the wearable device 105. The optical combiner 130 can be the lens 180 or a portion of the lens 180. The wearable device 105 can include a single near eye display 100, as shown in FIG. 1B. For example, the one or more light sources 150 and the controller 160 can be coupled to a temple 185 of the wearable device 105. The near eye display engine 110 is also located close to the controller 160, such as at the temple 185. In other examples, the near eye display engine 110 and the controller 160 can be located at a front frame 190 of the wearable device 105. The near eye display engine 110, including the SLM with other optical components, is configured to project images onto the eye retina through the eye pupil of the human eye 170 and a lens 180. The near eye display engine 110 can also project two images through the two lenses 180, such as through respective optical waveguides (not shown). In examples, the wearable device 105 can also include two near eye displays 100 each for projecting images on a respective lens 180 of the two lenses 180.

In examples, the optical combiner 130 includes a holographic optical element (HOE) (not shown) on the lens 180. The HOE is an optical structure that can be manufactured on or in a dielectric material (e.g., glass or optical plastic), such as in the lens 180. For example, the HOE can be a single layer of a diffraction grating or can be formed by multiple layers of diffraction gratings. The HOE is a transparent diffraction surface that modulates light projected on the HOE to produce three-dimensional (3D) images that can be viewed looking though the optical combiner 130. The modulated light 120 can be projected by the SLM from the near eye display engine 110 onto the HOE of the optical combiner 130 to display 3D images to the human eye 170. The 3D images can be viewed with a perception of depth in the direction of the line of sight in front of the wearable device 105.

Figure 2:
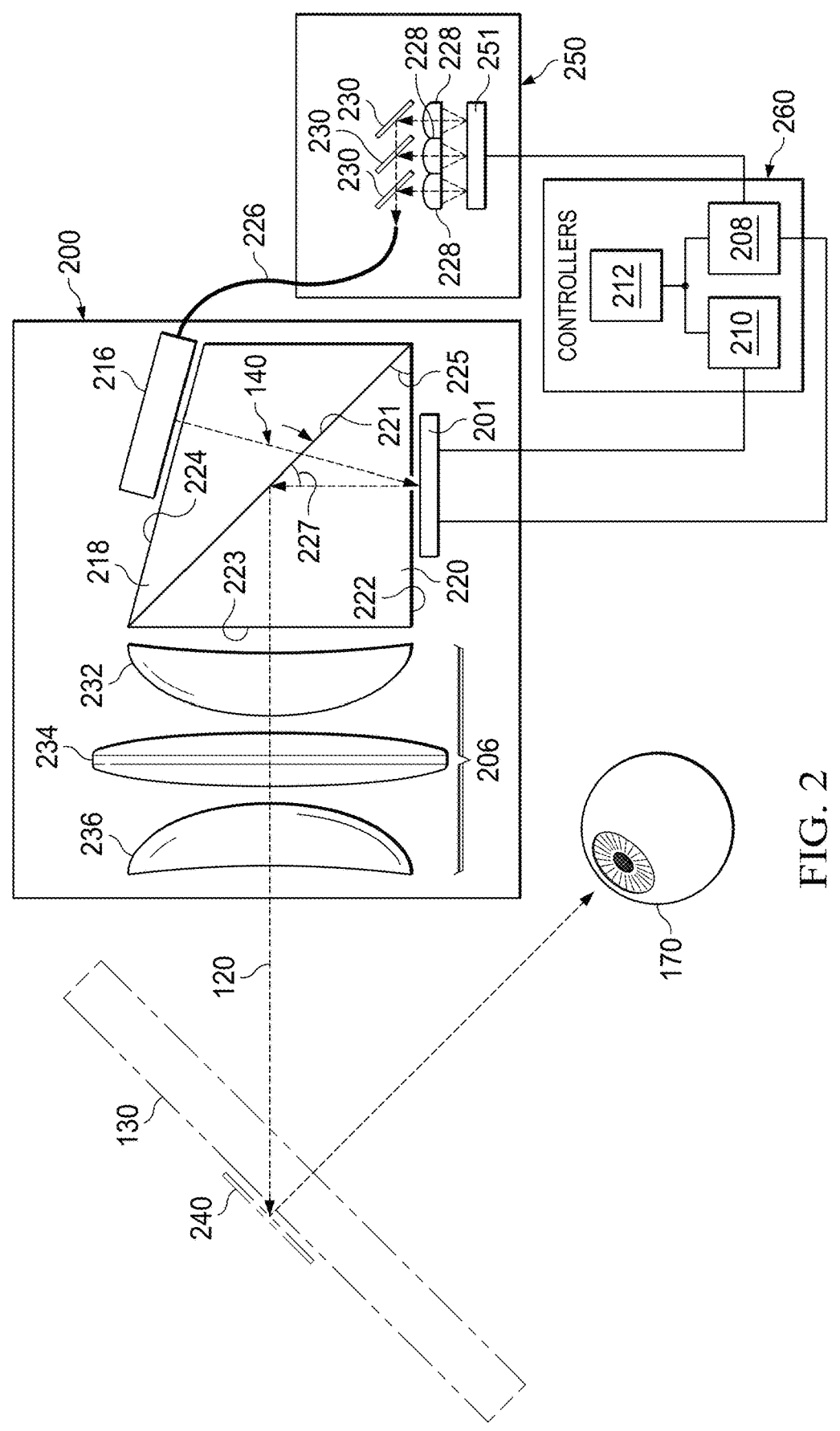
FIG. 2 is a diagram of an apparatus of a near eye display engine, in accordance with various examples.

FIG. 2 is a diagram of an apparatus 200 of a near eye display engine, in accordance with various examples. For example, the apparatus 200 is the near eye display engine 110 of the near eye display 100. The apparatus 200 includes the SLM 201, focusing optics 206, an optical waveguide coupler 216, a first prism 218, and a second prism 220. The apparatus 200 is coupled to one or more light sources 250 and one or more controllers 260. For example, the one or more light sources 250 and controllers 260 are the one or more light sources 150 and controllers 160, respectively, of the near eye display 100. The controllers 260 may include a first controller 208 for controlling the one or more light sources 250 and the SLM 201, and a second controller 210 for controlling the SLM 201. The first controller 208 and the second controller 210 can be different controllers. For example, the first controller 208 can be an analog controller and the second controller 210 can be a digital controller. The controller 208 can transmit pulse width modulation (PWM) signals to the SLM 201. The controllers 260 can also include a processor 212 which coordinates between the controllers 260 to modulate, by the SLM 201, the incident light 140 transmitted from the one or more light sources 250. The processor 212 or the controllers 260 can process an image for display to produce a processed image, which can be a digital image. The controllers 260 can provide, based on the processed image, control signals to the SLM 201 and the one or more light sources 250 to modulate the incident light 140 and project the modulated light 120 to display an output image.

The second controller 210 controls optical elements (not shown) of the SLM 201, such as micromirrors of a DMD. For example, if the SLM 201 is a DMD, the optical components are adjustable tilting micromirrors that are tilted by applying voltages. When a DMD is used, static random access memory (SRAM) cells are behind each micromirror. The second controller 210 may be a digital controller that determines whether the micromirrors are an on-state or an off-state. The on-state can tilt a micromirror at a first angle to reflect/project light onto an optical path to provide a bright pixel in the image, and the off-state can tilt the micromirrors at a second angle to deflect light away from this optical path and accordingly provide a dark pixel in the image. The second controller 210 writes bits into the SRAM memory cells. The one-bit value is useful to switch a respective micromirror of the SLM 201 between the on-state for reflecting/projecting light and the off-state to deflect light. Based on PWM signals from the controller 208, the micromirrors are set based on the bit values in the corresponding SRAM cells. For example, a zero-bit value can switch the micromirror to an off-state and a one-bit value can switch the micromirror to an on-state. In other examples, the SLM 201 is an LCOS or a FLCOS, and the optical elements are liquid crystals that are oriented by applying voltage to modulate the intensity of light across the image pixels.

The first prism 218 and the second prism 220 can have different shapes. For example, as shown in FIG. 2, the first prism 218 and the second prism 220 can have different sizes and edge angles. The first prism 218 and the second prism 220 can also have the same or different refraction indices. The first prism 218 and second prism 220 are optically coupled to the SLM 201, the optical waveguide coupler 216, and the focusing optics 206 on different respective sides. As shown in FIG. 2, the first prism 218 is coupled to the second prism 220 on a first side 221. The first prism 218 can also be in contact with the second prism 220 on the first side 221. The second prism 220 is also optically coupled to the SLM 201 on a second side 222, and to the focusing optics 206 on a third side 223. The first prism 218 is coupled to the optical waveguide coupler 216 on a side 224 of the second prism 220. For example, the side 224 of the first prism 218 can be in contact with a side of the optical waveguide coupler 216 or can be separated by an air gap from the optical waveguide coupler 216. The optical waveguide coupler 216 is also optically coupled to the one or more light sources 250 through an optical fiber 226, which is coupled to the optical waveguide coupler 216. In the apparatus 200, the first prism 218 and second prism 220 with the focusing optics 206 and the SLM 201 represent a near eye display engine that projects images onto a retina (e.g., of the human eye 170) or on a lens 180 of the wearable device 105.

The one or more light sources 250 can include three light sources such as LEDs/lasers 251 that provide three color modes at three respective wavelengths, such as for blue, green, and red light. The three color modes provide three basic color components for displaying an image in full color. The LEDs/lasers 251 transmit the incident light 140 for three color modes (e.g., blue, green, and red) at three respective wavelengths or ranges of wavelengths. The one or more light sources 250 including the LEDs/lasers 251 can be controlled, by one of the controllers 260 (e.g., the first controller 208), to simultaneously transmit the color modes in the incident light 140 to the SLM 201, through the fiber 226, optical waveguide coupler 216, first prism 218, and second prism 220. In other examples, the color modes can be transmitted by time multiplexing the one or more light sources 250.

The one or more light sources 250 also include collimating optics 228 that can be optically coupled to the optical fiber 226 through respective reflectors 230 (e.g., mirrors). Each set of collimating optics 228 can be optically coupled to project a respective color mode of the one or more light sources 250. For example, each set of collimating optics 228 is optically coupled to a respective LED/laser 251 for a color mode of light. Each set of collimating optics 228 can include a single lens, as shown in FIG. 2, or can include multiple lenses in other examples. Each set of collimating optics 228 is configured to project and collimate a beam of light for a respective color mode from the one or more light sources 250 to a respective reflector 230, which reflects the beam of light to the optical fiber 226. The light beams of the color modes form the one or more light sources form the incident light 140. The optical fiber 226 can extend between the one or more light sources 250 and the optical waveguide coupler 216 to allow the placement of the two components in different parts of the wearable device 105, as shown in FIG. 1B. For example, the one or more light sources 250 can be coupled to the optical waveguide coupler 216 of the apparatus 200 on the temple 185 of the wearable device 105. The length of the optical fiber 226 can depend on the size and dimensions of the wearable device 105. For example, the length of the optical fiber 226 can be within tens of millimeters to tens of centimeters. Separating the near eye display 100 into smaller components allows a more compact design for the near eye display 100 and the wearable device 105. The incident light 140 is transferred by the optical fiber 226 from the one or more light sources 250 to the optical waveguide coupler 216.

The optical waveguide coupler 216 is configured to direct the incident light 140 from the optical fiber 226 to the first prism 218 on the side 224. The first prism 218 transmits the incident light 140 to the second prism 220 through the first side 221. The second prism 220 in turn transmits the incident light 140 onto the SLM 201, which modules the incident light 140 and accordingly reflects the modulated light 120 at a certain reflection angle from the surface of the SLM 201 to the second prism 220. The second prism 220 is configured to direct the modulated light 120 from the SLM 201 to the focusing optics 206 on the third side 223. The modulated light 120 is directed by the second prism 220 to the focusing optics 206 by internal reflection at the first side 221, also referred to herein as total internal reflection (TIR). The TIR can depend on the reflection angle of the modulated light 120, the refraction index of the second prism 220, and the wedge angle 225 between the first side 221 and the second side 222. The wedge angle 225 can determine the angle of reflection 227 of the modulated light 120 from the first side 221 to meet a condition of TIR. If the first prism 218 is in direct contact with the second prism 220, such as without an air gap between the first prism 218 and the second prism 220, the TIR can also depend on the refraction index of the first prism 218 which can be higher than the refraction angle of the second prism 220. Accordingly, the refraction index of the second prism 220, or of both the first prism 218 and the second prism 220, and the wedge angle of the second prism 220 can be determined according to the reflection angle of the modulated light 120 from the SLM 201 to cause the TIR of the modulated light 120 in the second prism 220. The second prism 220 with such TIR configuration for the modulated light 120 with the SLM 201 and the focusing optics 206 is also referred to herein as a reverse TIR (RTIR) prism.

The focusing optics 206 are configured to project the modulated light 120 from the SLM 201 to produce an output image according to the processed image of the processor 212 or the controllers 260. The focusing optics 206 can include one or more lenses that collimate and focus the incident light 140 onto the optical combiner 130 of the near eye display 100. The optical combiner 130 is configured to display the output image. For example, the focusing optics 206 includes a first lens 232 that collimates a spreading or defocused beam of modulated light 120 from the SLM 201. The focusing optics 206 also includes a second lens 234 that relays the collimated beam of modulated light 120 from the first lens 232 to a third lens 236. The third lens 236 focuses and adjusts the size of the illumination area of the beam on the optical combiner 130, such as to match a size of an HOE 240 on the optical combiner 130. The human eye 170 can view the projected image by the SLM 201 as a reflection of the modulated light 120 from the optical combiner 130 or the HOE 240. The projected image represents the output image where the optical combiner 130 is the projection surface to display the output image.

Figure 3:
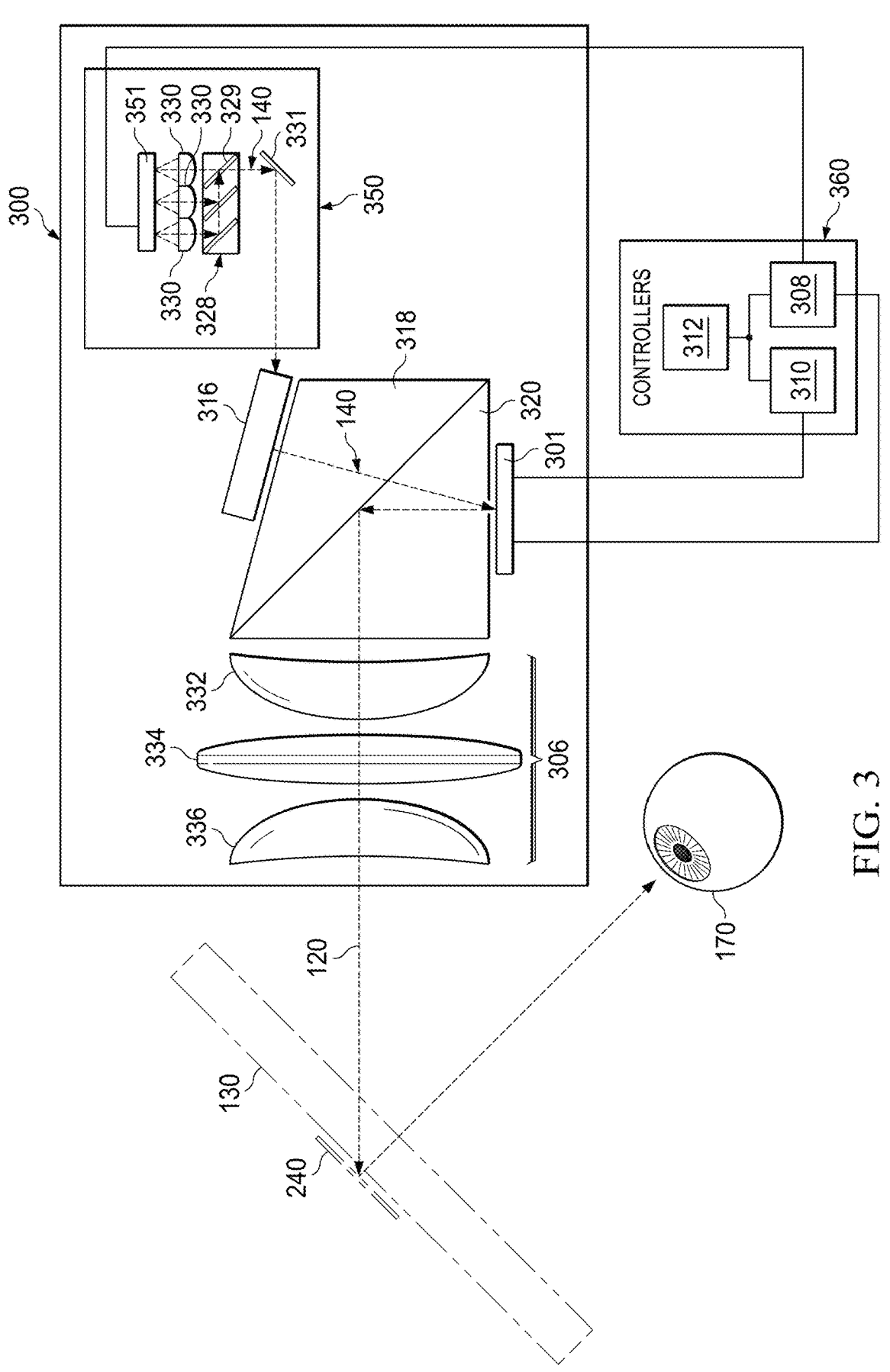
FIG. 3 is a diagram of an apparatus of a near eye display engine, in accordance with various examples.

In other examples, the near eye display engine of the near eye display 100 can be optically coupled to the one or more light sources 250 without the optical fiber 226. For example, the near eye display engine can be integrated with the one or more light sources 250 into a single component according to certain form factor requirements of the wearable device 105. FIG. 3 is a diagram of an apparatus 300 of a near eye display engine, in accordance with various examples. For example, the apparatus 300 is the near eye display engine 110 of the near eye display 100. The apparatus 300 includes the SLM 301, focusing optics 306, an optical waveguide coupler 316, a first prism 318, a second prism 320, and one or more light sources 350. The apparatus 300 is also coupled to one or more controllers 360. For example, the one or more light sources 350 and controllers 360 are the one or more light sources 150 and controllers 160, respectively, of the near eye display 100. The light sources 350 and the SLM 301 of the apparatus 300 can be coupled to a first controller 308 which is an analog controller in the controllers 360. The SLM 301 is also coupled to a second controller 310 which is a digital controller in the controllers 360. The controllers 360 also include a processor 312 which coordinates between the first controller 308 and the second controller 310 to provide the modulated light 120 by the SLM 301.

The first prism 318 and second prism 320 are optically coupled to the SLM 301, the optical waveguide coupler 316, and the focusing optics 306 on different respective sides, as shown in FIG. 3. The first prism 318 and second prism 320 of the apparatus 300 are coupled to each other and to the remaining components of the apparatus 300 in a manner similar to the first prism 218 and second prism 220 of the apparatus 200.

As shown in FIG. 3, the optical waveguide coupler 316 of the apparatus 300 is coupled to the first prism 318. In examples, the optical waveguide coupler 316 can be in contact with a side of the first prism 318 or can be separated by an air gap from the first prism 318. The optical waveguide coupler 316 is also optically coupled to the one or more light sources 350 without an optical fiber. The one or more light sources 350 can be optically coupled to the optical waveguide coupler 316 in the same area of the wearable device 105, such as on the temple 185 or the front frame 190. The optical waveguide coupler 316 can be optically coupled and in close proximity to the one or more light sources 350 by reflectors, without an optical fiber. The light sources 350 can include LEDS/lasers 351, a waveguide 328 of partial reflectors, and a collimating lens 330. The LEDs/lasers 351 are coupled, without an optical fiber, to the optical waveguide coupler 316 by a waveguide 328 of partial reflectors. The waveguide 328 can include multiple partial reflector surfaces 329 that reflect respective beams of light of the color modes from the LEDs/lasers 351, and combine the beams of the color modes into a single beam of the incident light 140. Each partial reflector surface 329 for a color mode can be optically coupled to an LED/laser 351 by a collimating lens 330, as shown in FIG. 3, or by multiple lenses in other examples. In examples, the light sources 350 can also include a shared reflector 331 optically coupled to the waveguide 328. The shared reflector 331 directs the beam of incident light 140 from the partial reflector surfaces 329 to the optical waveguide coupler 316. The shared reflector 331 can be a separate reflector optically coupled to the waveguide 328. In other examples, the shared reflector 331 can be integrated with the partial reflector surfaces 329 as part of the waveguide 328.

The focusing optics 306 can include one or more lenses that collimate and focus the incident light 140 from the second prism 320 onto the optical combiner 130 of the near eye display 100. For example, the focusing optics 306 includes a first lens 332 that collimates a beam of the modulated light 120 from the SLM 301, and a second lens 334 that relays the beam of modulated light 120 from the first lens 332 to a third lens 336. The third lens 336 focuses the beam of modulated light 120 onto the optical combiner 130, which can include the HOE 240. The optical combiner 130 or the HOE 240 reflects the projected image in the modulated light 120 to the human eye 170.

In the apparatuses 200 and 300, the focusing optics 206 and 306, respectively, are transmissive optics that transmit the modulated light 120 from the SLM 301 to the optical combiner 130. In other examples, reflective focusing optics can be useful to direct the modulated light 120 from the SLM 301 to the optical combiner 130, such as to reduce the optical path length and provide a more compact near eye display 100.

Figure 4A:
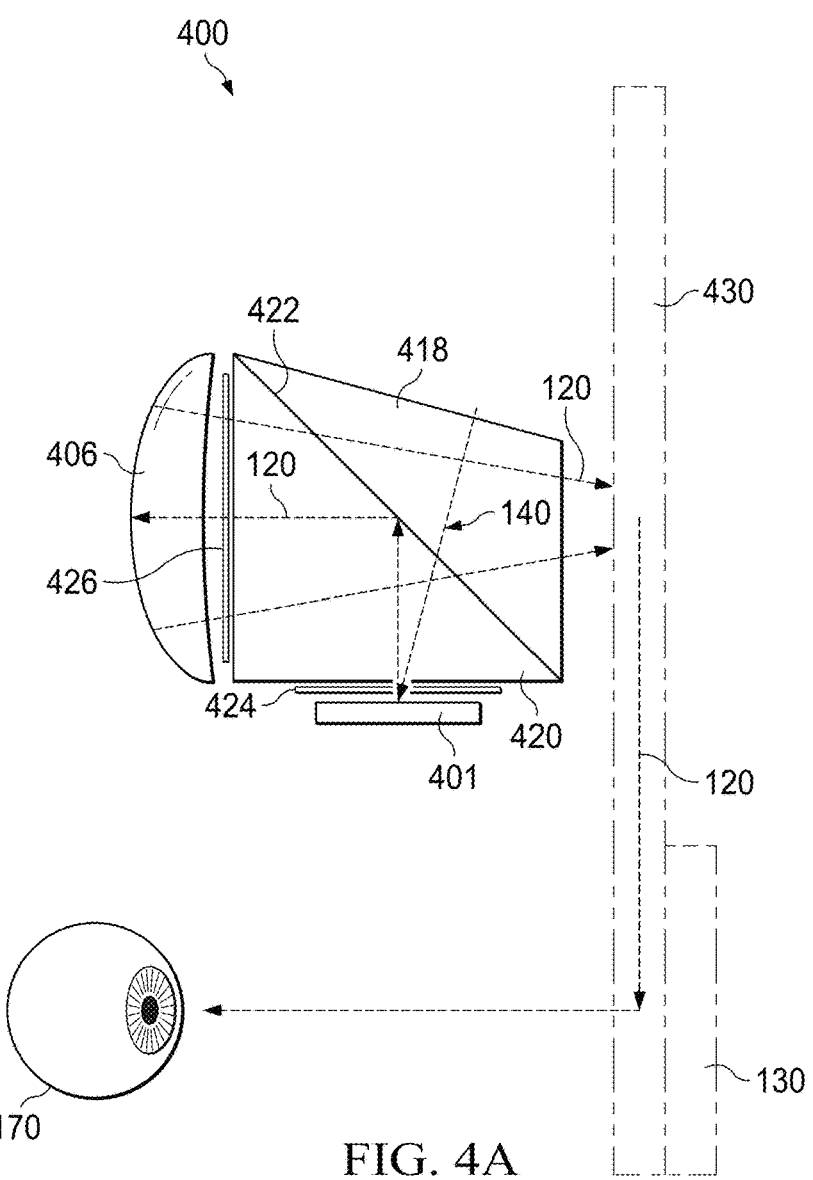
FIG. 4A is a diagram of a side view of an apparatus of a near eye display engine, in accordance with various examples.
Figure 4B:
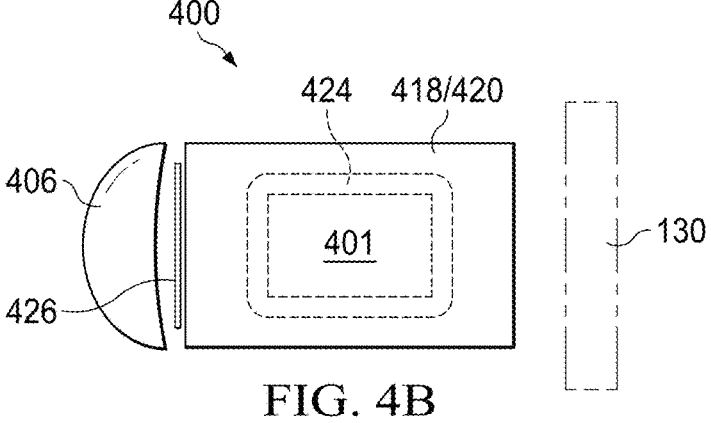
FIG. 4B is a diagram of a top view of the apparatus of FIG. 4A, in accordance with various examples.

FIGS. 4A and 4B are diagrams of a side view and a top view, respectively, of an apparatus 400 of a near eye display engine, in accordance with various examples. For example, the apparatus 400 is the near eye display engine 110 of the near eye display 100. The apparatus 400 includes the SLM 401, focusing optics 406, a first prism 418, a second prism 420, a polarization splitter 422, a first quarter-wave plate 424, a second quarter-wave plate 426, and an optical waveguide 430. The focusing optics 406 are reflective optics configured to reflect and focus the modulated light 120. The first prism 418 and second prism 420 are optically coupled, on different respective sides, to the SLM 401 and the focusing optics 406, as shown in FIG. 4A. The first prism 418 can be optically coupled to one or more light sources, such as the one or more light sources 150 (not shown). The focusing optics 406 can include a single lens, as shown in FIG. 4, that is made of or coated with a reflective surface (e.g., a mirror). The reflective lens is configured to reflect the modulated light 120 transmitted from the second prism 420 on an optical path from the reflective lens through the second prism 420 and the first prism 418. In other examples, the focusing optics 406 can include optical components with a reflective surface. For example, the focusing optics 406 can include a mirror optically coupled to one or more lenses to reflect and focus light, respectively.

The apparatus 400 also includes the polarization splitter 422 between the first prism 418 and the second prism 420. The polarization splitter 422 can be coupled to the opposite sides of the first prism 418 and second prism 420. The polarization splitter 422 is a polarized beam splitter which can be formed from a dielectric material or layers as a half mirror to the color modes in the incident light 140 and the modulated light 120, based on light polarization. The half mirror is configured to transmit light at a certain first polarization and reflect the light at a second polarization orthogonal to the first polarization. Accordingly, the incident light 140 with the color modes from the one or more sources (not shown) is polarized at the first polarization and transmitted through the first prism 418. The incident light 140 at the first polarization is then transmitted by the polarization splitter 422 to the SLM 401 through the second prism 420.

The apparatus 400 also includes the first quarter-wave plate 424 between the second prism 420 and the SLM 401 and facing one side of the first prism 418, and the second quarter-wave plate 426 located between the second prism 420 and the focusing optics 406 and facing another side of the second prism 420. The first quarter-wave plate 424 and the second quarter-wave plate 426 are formed from a dielectric material configured to rotate the polarization of light by 45 degrees (°) within a wavelength range that includes the color modes of the incident light 140. Accordingly, the first polarization of the incident light 140 which is transmitted from the second prism 420 to the SLM 401 is rotated by the first quarter-wave plate 424 by 45° before illuminating the surface of the SLM 401. The SLM 401 modulates the incident light 140 to produce the modulated light 120 which is transmitted through the first quarter-wave plate 424 to the second prism 420. Because the first quarter-wave plate 424 rotates the polarization of the modulated light 120 by another 45° with respect to the polarization of the incident light 140, the modulated light 120 transmitted by the second prism 420 to the polarization splitter 422 becomes polarized at the second polarization that is orthogonal to, or rotated by a total of 90° with respect to, the first polarization of the incident light 140 from the first prism 418. The modulated light 120 having the second polarization is then reflected in the first prism 418 by the polarization splitter 422 to the focusing optics 406.

The second polarization of the modulated light 120, which is transmitted from the to the focusing optics 406 is rotated by the second quarter-wave plate 426 by 45°. The polarization of the modulated light 120 that is reflected from the focusing optics 406 to the second prism 420 is rotated again by the second quarter-wave plate 426 by 45°. This causes the reflected modulated light 120 transmitted in the second prism 420 from the focusing optics 406 to the polarization splitter 422 to be polarized at the first polarization. Accordingly, the modulated light 120 is transmitted by the polarization splitter 422 to the first prism 418.

The apparatus 400 can also include the optical waveguide 430 that is coupled to the first prism 418 and an optical combiner, such as the optical combiner 130. The optical waveguide 430 is an optical structure, such as a strip or a planar structure, configured to confine, direct and transfer light from one side to another side of the optical waveguide 430. The optical waveguide 430 can be formed from a dielectric material (e.g., glass or optical plastic). In other examples, the optical waveguide 430 can be an optical fiber. The optical waveguide 430 is configured to transfer the modulated light 120 from the first prism 418 to the optical combiner 130 to reflect the modulated light 120 to the human eye 170 to display an image. For example, the optical waveguide 430 can extend on the front frame 190 of the wearable device 105 between the near eye display engine (e.g., the apparatus 400) and the optical combiner 130 on the lens 180. In examples, the optical waveguide 430 can be optically coupled to the first prism 418 and the HOE 240 on the optical combiner 130.

The polarized property of the polarization splitter 422 can increase the light projection efficiency of the apparatus 400, which represents the ratio of the modulated light 120 provided by the near eye display engine to the incident light 140 provided by one or more light sources, such as the one or more light sources 150. The light projection efficiency is based on transmitting or reflecting, by the polarization splitter 422, all or approximately all (e.g., more than 90 percent) of the incident light 140 or modulated light 120 at the first polarization or second polarization. The first quarter-wave plate 424 and second quarter-wave plate 426 are required to obtain this light projection efficiency by the polarization splitter 422. This light projection efficiency also requires the incident light 140 to be polarized at the first polarization, such as by configuring the one or more light sources 150 to polarize the incident light 140 or by coupling the one or more light sources 150 to one or respective light polarizers. For example, the incident light 140 can be polarized in a certain polarization mode using an optical polarizer, which can be coupled to an LED in the one or more light sources. A polarizer is an optical filter that causes light waves of a certain polarization mode to pass through while blocking light waves of other polarization modes. The incident light 140 can also be polarized in a certain polarization mode by a polarized laser in the one or more light sources without coupling the polarized laser to an optical polarizer. In other examples, the near eye display engine can be configured to direct non-polarized incident light and modulated light into and from the near eye display engine with a non-polarized beam splitter and without quarter-wave plates, which can reduce the cost of the near eye display 100.

Figure 5A:
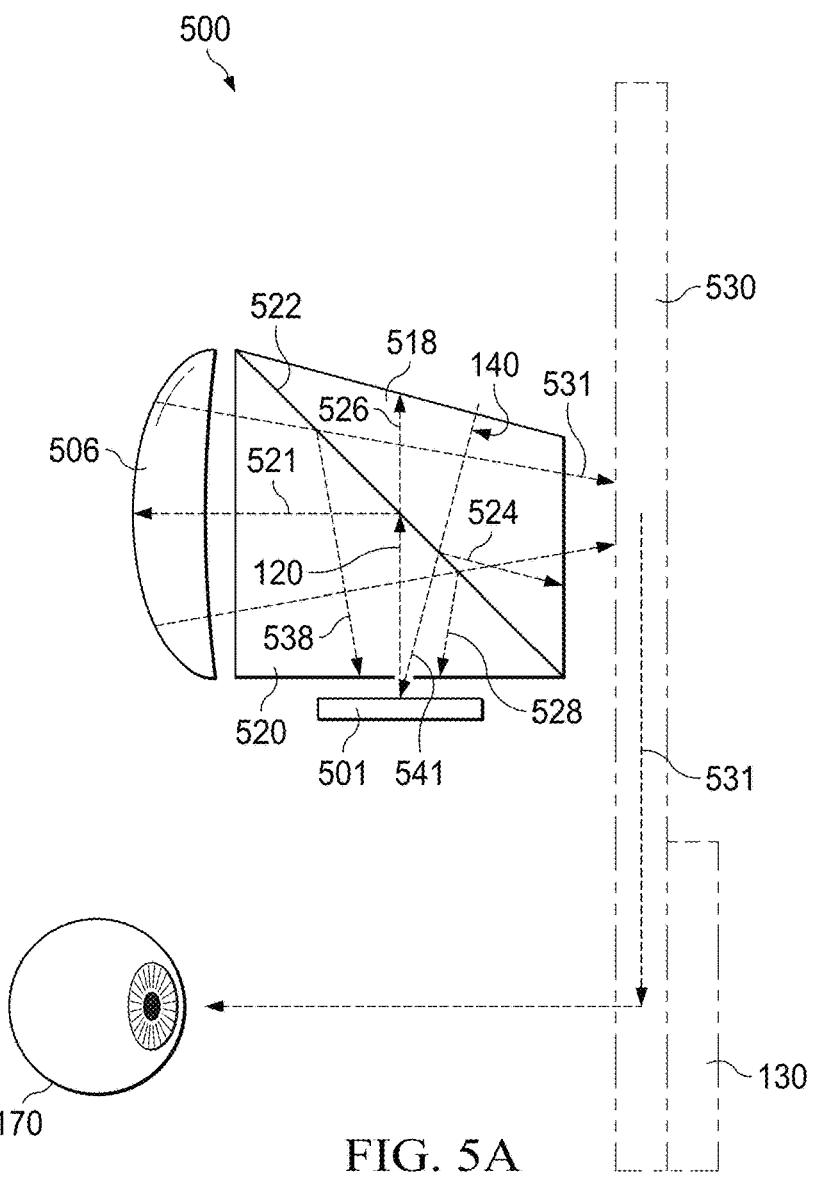
FIG. 5A is a diagram of a side view of an apparatus of a near eye display engine, in accordance with various examples.
Figure 5B:
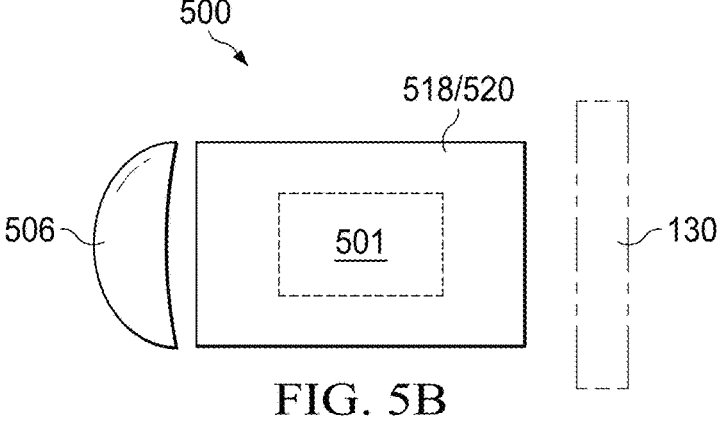
FIG. 5B is a diagram of a top view of the apparatus of FIG. 5A, in accordance with various examples.

FIGS. 5A and 5B are diagrams of a side view and a top view, respectively, of an apparatus 500 of a near eye display engine, in accordance with various examples. For example, the apparatus 500 is the near eye display engine 110 of the near eye display 100. The apparatus 500 includes the SLM 501, reflective focusing optics 506, a first prism 518, a second prism 520, and a non-polarized beam splitter 522. The first prism 518 and second prism 520 are optically coupled, on different respective sides, to the SLM 501 and the reflective focusing optics 506, as shown in FIG. 5A. The first prism 518 can be optically coupled to one or more light sources, such as the one or more light sources 150 (not shown).

The non-polarized beam splitter 522 is located between the first prism 518 and second prism 520 and can be coupled to the opposite sides of the first prism 518 and second prism 520. The non-polarized beam splitter 522 is formed from a dielectric material that can be a half mirror for unpolarized light. The half mirror is configured to transmit a portion of the unpolarized light, and reflect a remaining portion of the unpolarized light from the surface of the half mirror. For example, the non-polarized beam splitter 522 can be configured to transmit and reflect the incident light 140, including the color modes, at a 50 to 50 percent ratio. Accordingly, the non-polarized beam splitter 522 transmits half (or approximately half) of the incident light 140 and reflects the other half of the incident light 140 from the surface of the non-polarized beam splitter 522. In other examples, the non-polarized beam splitter 522 can be configured to transmit and reflect the incident light 140 at ratios other than 50 to 50 percent (%). The incident light 140 from the light sources (not shown) which is unpolarized is transmitted through the first prism 518. A first portion 541 of this unpolarized incident light 140 (e.g., approximately 50% of the incident light 140) in the first prism 518 is then transmitted by the non-polarized beam splitter 522 to the SLM 501 through the second prism 520. A second or remaining portion of the incident light 140 (e.g., also approximately 50%) is reflected from the surface of the non-polarized beam splitter 522 away from the SLM 501. The reflected second portion of the incident light 140 represents first stray light 524 in the apparatus 500, which is not useful in the near eye display 100.

The first portion 541 of incident light 140 transmitted from the first prism 518 is also transmitted from the second prism 520 to the SLM 501 and then modulated in the modulated light 120 from the SLM 501 to the second prism 520. A first portion 521 of this modulated light 120 (e.g., approximately 50 percent of the modulated light 120) in the second prism 520 is then reflected by the non-polarized beam splitter 522 to the reflective focusing optics 506 through the second prism 520. A second or remaining portion of the modulated light 120 (e.g., also approximately 50 percent of the modulated light 120) is transmitted from the second prism 520 to the first prism 518. This second transmitted portion of the modulated light 120 represents second stray light 526 in the apparatus 500, which is not useful in the near eye display 100.

The first portion 521 of the modulated light 120 reflected by the non-polarized beam splitter 522 is transmitted from the second prism 520 to the reflective focusing optics 506, and then focused and reflected from the reflective focusing optics 506 to the second prism 520. A first portion 531 of this focused and reflected modulated light 120 (e.g., approximately 50% of the modulated light 120) in the second prism 520 is transmitted by the non-polarized beam splitter 522 to an optical waveguide 530 through the first prism 518. A second or remaining portion of the focused and reflected modulated light 120 (e.g., also approximately 50% of the modulated light 120) is reflected by the non-polarized beam splitter 522 in the second prism 520. For example, this second portion of the modulated light 120 represents third stray light 538 in the apparatus 500 that is not useful in the near eye display 100. The optical waveguide 530 can be coupled to the first prism 518 and configured to transfer the first portion 531 of the modulated light 120 from the first prism 518 to the optical combiner 130 to project the modulated light 120 to the human eye 170 to display an image.

The modulated light 120 is provided in the apparatus 500 without polarizing the incident light 140 and without quarter-wave plates, which can reduce the cost of the near eye display 100 and simplify the compact design of the near eye display engine. The light projection efficiency of the apparatus 500 is also decreased in comparison to the apparatus 400. The decrease in light projection efficiency of the apparatus 500 is caused by the loss of the first, second, and third stray light 524, 526, and 528 which are not useful in the near eye display 100. The loss of light can be greater than half of the incident light 140. In examples, the lens of the focusing optics 406 or 506 in the apparatus 400 or 500, respectively, can be shaped similar to a birdbath plate, as shown in FIG. 4A to FIG. 5B. The combination of the focusing optics 406, with such lens design, and the first prism 418 and the second prism 420 with the polarization splitter 422 (or the focusing optics 506 with the first prism 418, the second prism 420, and the non-polarized beam splitter 522) is also referred to herein as birdbath optics.

Figure 6A:
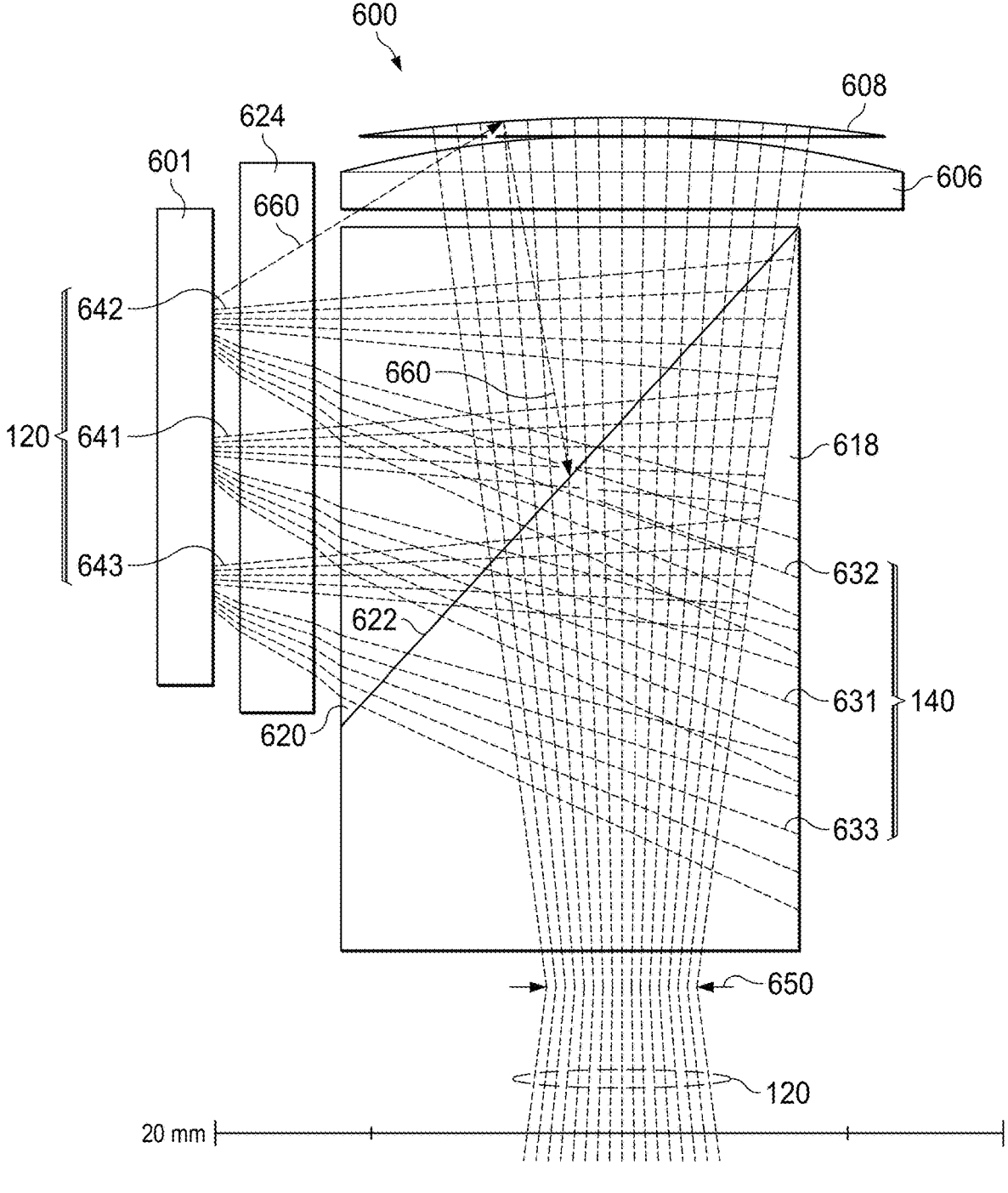
FIG. 6A is a diagram of an apparatus of a near eye display engine, in accordance with various examples.

FIG. 6A is a diagram of an apparatus 600 of a near eye display engine, in accordance with various examples. For example, the apparatus 600 is the near eye display engine 110 of the near eye display 100 and includes the SLM 601, focusing optics 606, a reflective surface 608, a first prism 618, a second prism 620, and a beam splitter 622. The focusing optics 606 can include a single lens, such as a spherical lens as shown in FIG. 6A, or can include multiple lenses in other examples. The reflective surface 608 can be an aspheric mirror that is optically coupled to the focusing optics 606 and configured to reflect light from the focusing optics 606. The aspheric mirror is configured to reflect the modulated light 120 transmitted from the lens of the focusing optics 606 on an optical path through the lens, the second prism 620, and the first prism 618. The first prism 618 and second prism 620 are optically coupled, on different respective sides, to the SLM 601 and the focusing optics 606, as shown in FIG. 6A. The first prism 618 can be optically coupled to one or more light sources, such as the one or more light sources 150 (not shown) through an optical waveguide coupler (not shown).

The apparatus 600 also includes the beam splitter 622 between the opposite sides of the first prism 618 and second prism 620. The beam splitter 622 can be a polarized beam splitter or a non-polarized beam splitter that is configured to transmit at least a portion of incident light 140 from the first prism 618 to the second prism 620, reflect at least a portion of the modulated light 120 in the second prism 620 from the SLM 601 to the focusing optics 606, and transmit at least a portion of the reflected and focused modulated light 120 in the second prism 620 from the focusing optics 606 to the first prism 618. When a polarized beam splitter 622 is used a quarter waveplate may be optically coupled between the second prism 620 and the SLM 601 and another quarter waveplate may be placed between the second prism 620 and the focusing optics 606. The apparatus 600 can also include a transparent cover 624 located between the SLM 601 and the second prism 620. The transparent cover 624 provides a protection to the optical elements of the SLM 601 from contact with other components.

The incident light 140 is formed of rays of light including an on-axis bundle of rays 631, which is at the center of the rays of the incident light 140. The on-axis bundle of rays 631 is shown in FIG. 6A as a bundle of converging rays from the first prism 618 to the surface of the SLM 601. FIG. 6A also shows a first off-center bundle of rays 632 and a second off-center bundle of rays 633 on sides of the incident light 140. The incident light 140 can include other rays (not shown) between the first off-center bundle of rays 632 and the second off-center bundle of rays 633. The extent of rays of incident light 140 between the first off-center bundle of rays 632 and second off-center bundle of rays 633 can determine the width of the incident light 140 on the SLM 601. The modulated light 120 also includes multiple rays, including an on-axis bundle of rays 641, a first off-center bundle of rays 642, and a second off-center bundle of rays 643, which are the respective reflections of the on-axis bundle of rays 631, first off-center bundle of rays 632, and second off-center bundle of rays 633 by the SLM 601. The on-axis bundle of rays 641, first off-center bundle of rays 642, and second off-center bundle of rays 643 are shown as bundles of diverging rays from the surface of the SLM 601. The modulated light 120 can include other rays (not shown) such as between the first off-center bundle of rays 642 and the second off-center bundle of rays 643. The extent of rays of modulated light 120 between the first off-center bundle of rays 642 and second off-center bundle of rays 643 can determine the width of the modulated light 120 that is focused and projected by the apparatus 600 to an optical combiner, such as the optical combiner 130 (not shown) to display an image.

The on-axis bundle of rays 641, first off-center bundle of rays 642, and second off-center bundle of rays 643 are reflected and focused by the reflective surface 608 and the focusing optics 606, respectively, on an optical path through the second prism 620 and first prism 618 which then projects the modulated light 120 such as to the optical combiner 130. The rays in the reflected and focused modulated light 120 including the on-axis bundle of rays 641, first off-center bundle of rays 642, and second off-center bundle of rays 643 converge into an eye aperture 650. For examples, the eye aperture 650 can have a width of approximately 4 millimeters (mm). The eye aperture 650 can be imaged by the near eye display 100 to the eye pupil (e.g., the human eye 170) or a lens 180 of the wearable device 105.

In the apparatus 600, some of the rays of the incident light 140 on the SLM 601 can be reflected from the surface of the SLM 601 as stray rays 660 outside the modulated light 120. The stray rays 660 may be reflected by the reflective surface 608 towards the eye aperture 650. If imaged with the eye aperture 650 by the near eye display 100, the stray rays 660 can change or reduce image quality in the projected image. In examples, to prevent the imaging of the stray rays 660 with the eye aperture 650, the stray rays 660 can be directed away from the eye aperture 650 by a wedge of the second prism 620.

Figure 6B:
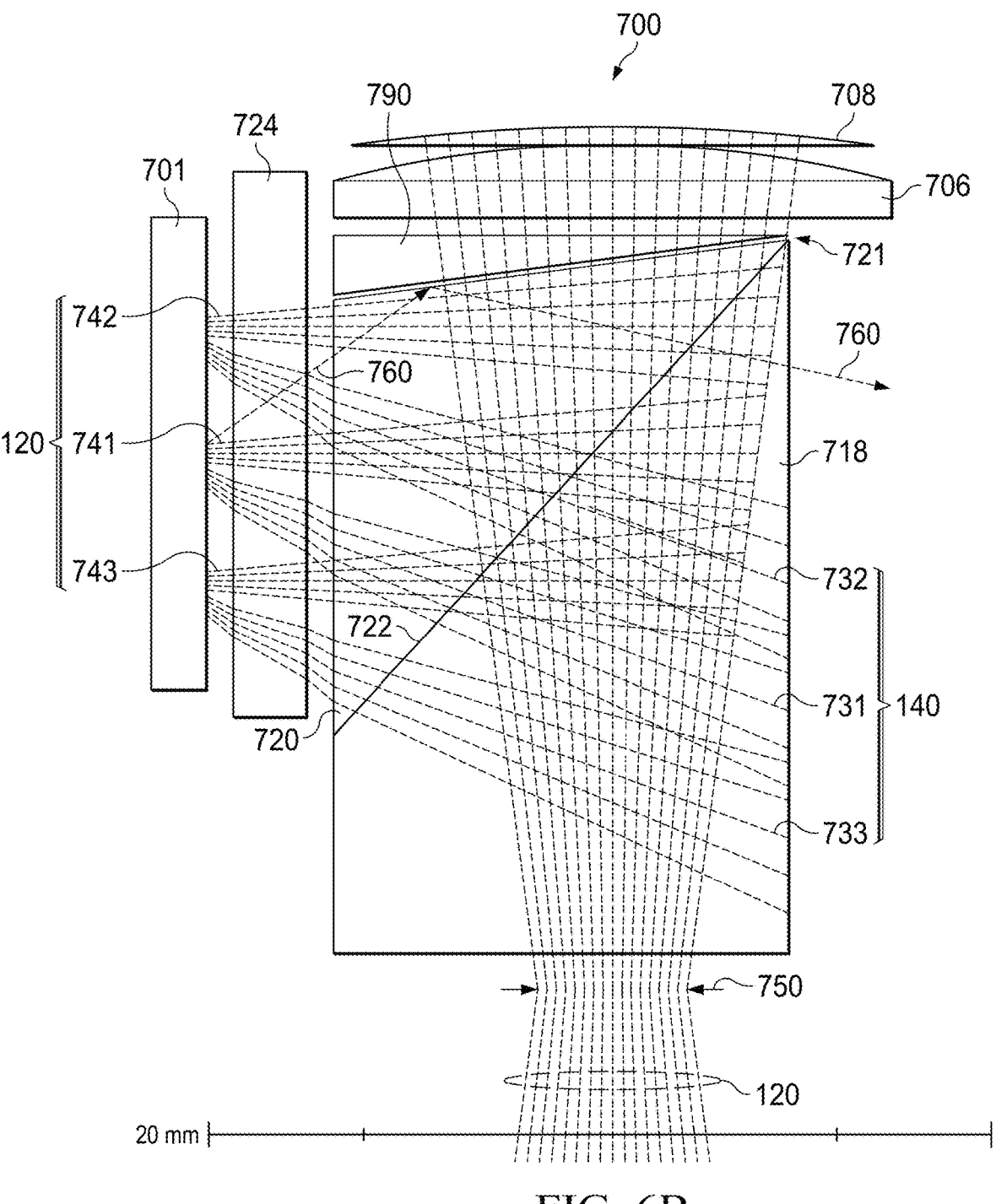
FIG. 6B is a diagram of an apparatus of a near eye display engine with a prism air gap, in accordance with various examples.

FIG. 6B is a diagram of an apparatus 700 of a near eye display engine with a prism air gap, in accordance with various examples. For example, the apparatus 700 is the near eye display engine 110 of the near eye display 100. The apparatus 700 includes the SLM 701, focusing optics 706, a reflective surface 708, a first prism 718, a second prism 720, and a beam splitter 722. The focusing optics 706 can include a single lens, as shown in FIG. 6B, or can include multiple lenses in other examples. The reflective surface 708 is optically coupled to the focusing optics 706. The first prism 718 and second prism 720 are optically coupled to the SLM 701 and the focusing optics 706. The first prism 718 can be optically coupled to one or more light sources, such as the one or more light sources 150 (not shown).

The apparatus 700 includes the beam splitter 722 between the opposite sides of the first prism 718 and second prism 720. The beam splitter 722 can be a polarized beam splitter or a non-polarized beam splitter. In examples where a polarized beam splitter is used, there may be a quarter waveplate optically coupled between the second prism 720 and the SLM 701, and another quarter waveplate optically coupled between the second prism 720 and the focusing optics 706. The apparatus 700 can also include a third prism

790, or a second portion or the second prism 720, separated by an air gap 721 from a side of the second prism 720 that faces the focusing optics 706. The beam splitter 722 forms, with the air gap 721 on that side of the second prism 720, a wedge in the second prism 720. The apparatus 700 can also include a transparent cover 724 between the SLM 701 and the second prism 720. The rays of incident light 140 include an on-axis bundle of rays 731, a first off-center bundle of rays 732, and a second off-center bundle of rays 733. The modulated light 120 also includes an on-axis bundle of rays 741, a first off-center bundle of rays 742, and a second off-center bundle of rays 743, which are the respective reflections of the on-axis bundle of rays 731, first off-center bundle of rays 732, and second off-center bundle of rays 733 by the SLM 701.

The on-axis bundle of rays 741, first off-center bundle of rays 742, and second off-center bundle of rays 743 are reflected and focused by the reflective surface 708 and the focusing optics 706, respectively, on an optical path through the second prism 720 and first prism 718 which then projects the modulated light 120 to the optical combiner 130. The rays of the modulated light 120, including the on-axis bundle of rays 741, first off-center bundle of rays 742, and second off-center bundle of rays 743 converge into an eye aperture 750, which is projected from the first prism 718. For examples, the eye aperture 750 can have a width of approximately 4 mm.

In the apparatus 700, some of the rays of the incident light 140 on the SLM 701 can be reflected as stray rays 760 outside the modulated light 120. The stray rays 760 from the SLM 701 are reflected at the air gap 721 across the second prism 720 away from the focusing optics 706 and the reflective surface 708. The stray rays 760 are reflected at the air gap 721 in the second prism 720 by TIR, which can depend on the reflection angle of the stray rays 760, the refraction index of the second prism 720, and the wedge angle between the air gap 721 and the beam splitter 722. Because the stray rays 760 are reflected away from the reflective surface 708, the stray rays 760 are not transmitted on the optical path from the reflective surface 708 to the eye aperture 750. Directing the stray rays 760 away from the eye aperture 750 prevents the imaging of the stray rays 760 with the eye aperture 750, which can increase image quality.

Figure 7:
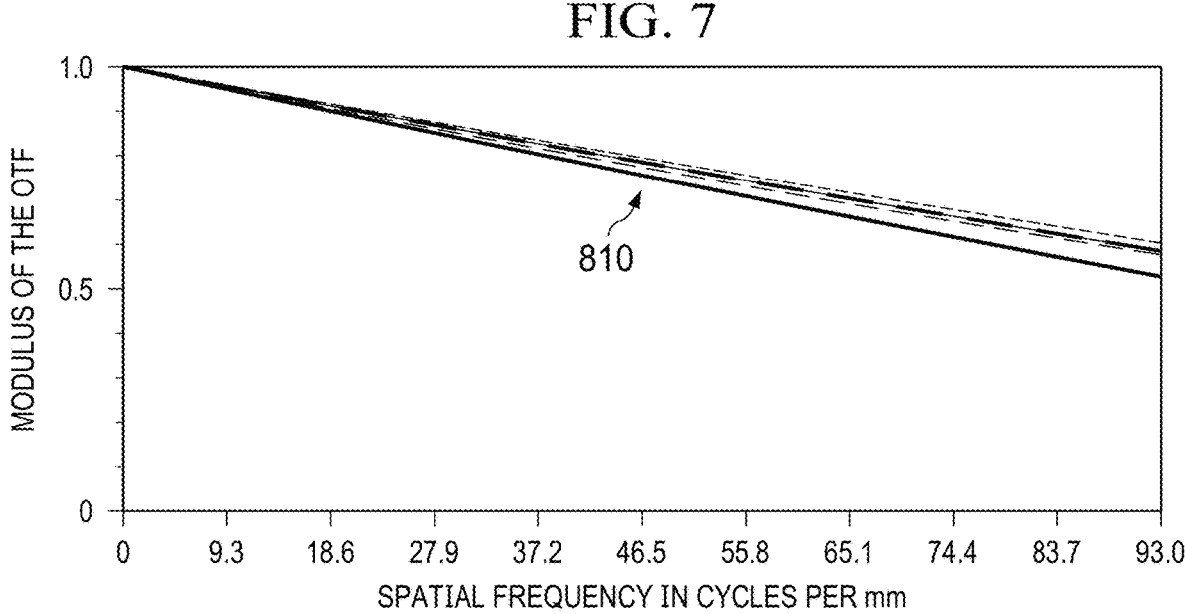
FIG. 7 is a graph representing an optical transfer function (OTF) of a blue color mode of the apparatus of FIGS. 6A-B, in accordance with various examples.

FIG. 7 is a graph representing an optical transfer function (OTF) of a blue color mode projected by the apparatus 600 or 700, in accordance with various examples. In the examples, the SLM 601 (or 701) of the apparatus 600 (or 700) is a DMD with adjustable tilting micromirrors. The blue color mode is one of the color modes projected in the modulated light 120 by the DMD. For example, the blue color mode transmitted by the one or more light sources 150 can have a wavelength of approximately 486 nanometers (nm). The x-axis represents a range of spatial frequencies in the image and the y-axis represents the MTF. The spatial frequencies are measured in cycles per mm (cycles/mm) which is an inverse measure of the spacing between adjacent lines or features in the image. For example, a higher spatial frequency indicates a shorter distance between the adjacent lines in the image. The range of spatial frequencies extends from 0 to 93 cycles/mm. For example, the highest spatial frequency of 93 cycles/mm represents adjacent lines that are spaced by approximately 0.01 mm. The MTF indicates the contrast level in the projected image. The contrast level extends from 1 for the highest contrast level to 0 which indicates no contrast. For example, at 0 contrast level, the adjacent lines or features in the image are indistinguishable to the human eye 170.

The curves 810 in the graph represent the contrast levels across the range of spatial frequencies. Each curve corresponds to a ray in the modulated light 120, including the on-axis bundle of rays 641, the first off-center bundle of rays 642, and the second off-center bundle of rays 643. The rays include a ray with 0° field of view at a central position in the on-axis bundle of rays 641, and rays of +25° and −25° fields of view in the first off-center bundle of rays 642 and second off-center bundle of rays 643. For all the corresponding rays, the curves 810 show a decrease in contrast level at higher spatial frequencies. For example, at the highest spatial frequency of 93 cycles/mm, the contrast level for all the rays is above 0.5, which is distinguishable to the human eye 170.

Figure 8:
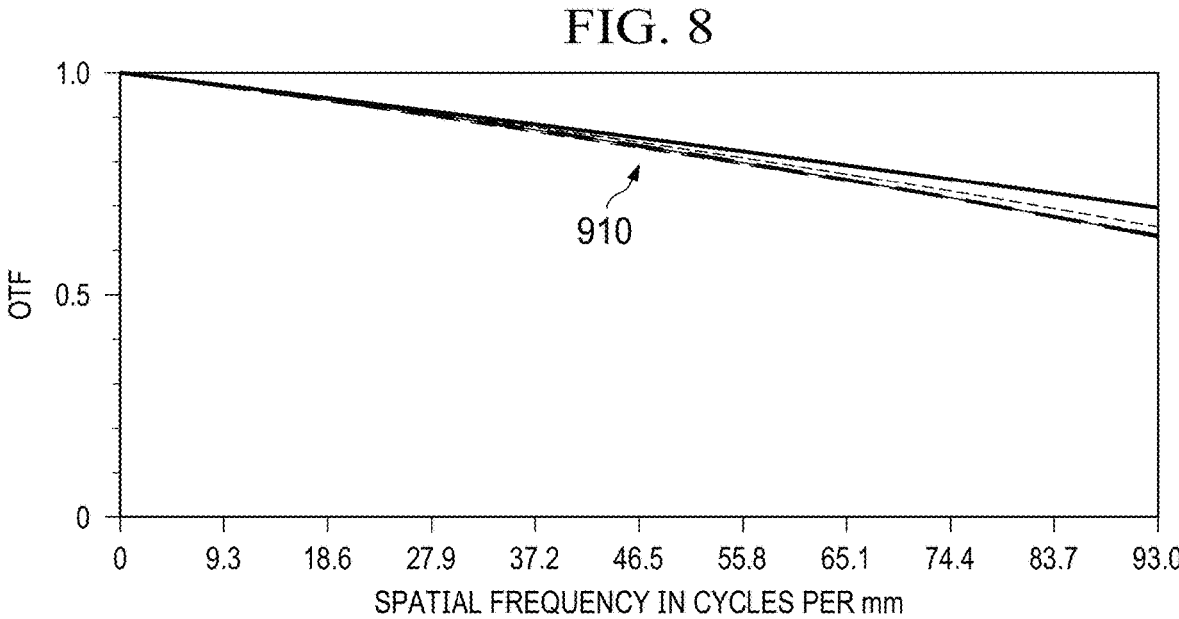
FIG. 8 is a graph representing an OTF of a green color mode of the apparatus of FIGS. 6A-B, in accordance with various examples.

FIG. 8 is a graph representing an OTF of a green color mode projected by the apparatus 600 or 700, in accordance with various examples. For example, the green color mode can be transmitted by the one or more light sources 150 at a wavelength of approximately 587 nm, and the SLM 601 or 701 is a DMD with adjustable micromirrors. In the graph, the x-axis represents the range of spatial frequencies in the image, and the y-axis represents the MTF in the displayed image. The curves 910 correspond to rays of the modulated light 120 including rays in the on-axis bundle of rays 641, the first off-center bundle of rays 642, and the second off-center bundle of rays 643. The rays include rays with 0°, +25°, and −25° fields of view. The curves 910 of the green color mode in FIG. 8 show a decrease in contrast level for higher spatial frequencies where the contrast level at the highest spatial frequency is above 0.6, which is distinguishable to the human eye 170.

Figure 9:
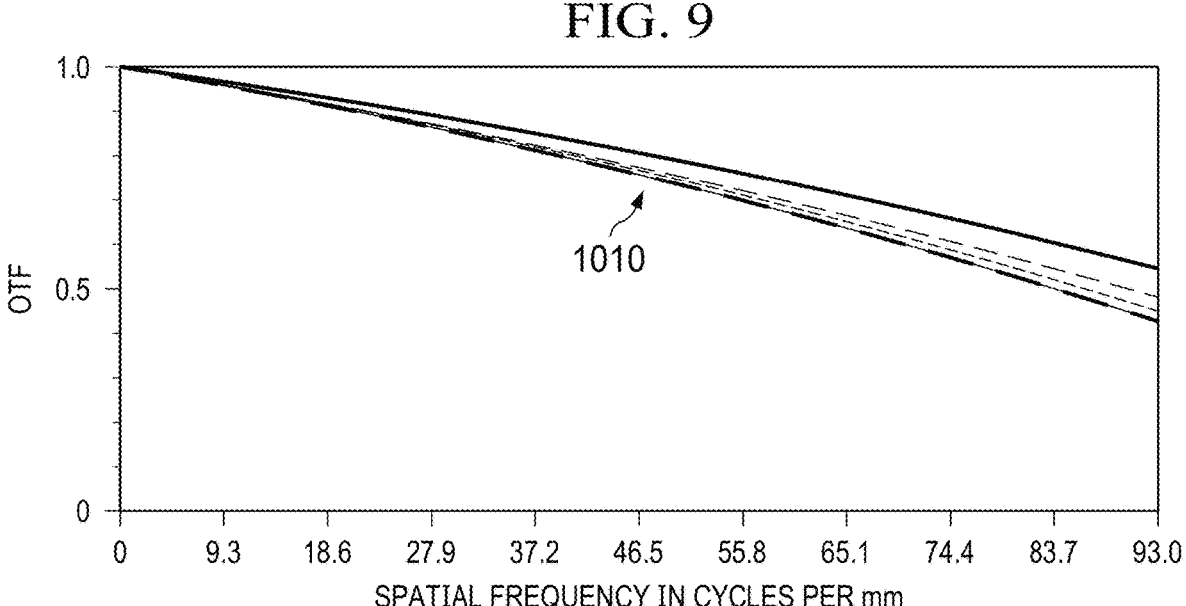
FIG. 9 is a graph representing an OTF of a red color mode of the apparatus of FIGS. 6A-B, in accordance with various examples.

FIG. 9 is a graph representing an OTF of a red color mode projected by the apparatus 600 or 700, in accordance with various examples. For example, the red color mode can be transmitted at a wavelength of approximately 656 nm, and the SLM 601 or 701 is a DMD with adjustable micromirrors. In the graph, the x-axis represents the range of spatial frequencies in the image, and the y-axis represents the MTF in the displayed image. The curves 1010 correspond to the rays of the modulated light 120 including the on-axis bundle of rays 641, the first off-center bundle of rays 642, and the second off-center bundle of rays 643. The rays include rays with 0°, +25°, and −25° fields of view. The curves 1010 of the red color mode in FIG. 9 show a decrease in contrast level for higher spatial frequencies, where the contrast level at the highest spatial frequency is above 0.4, which is also distinguishable to the human eye 170.

Figure 10:
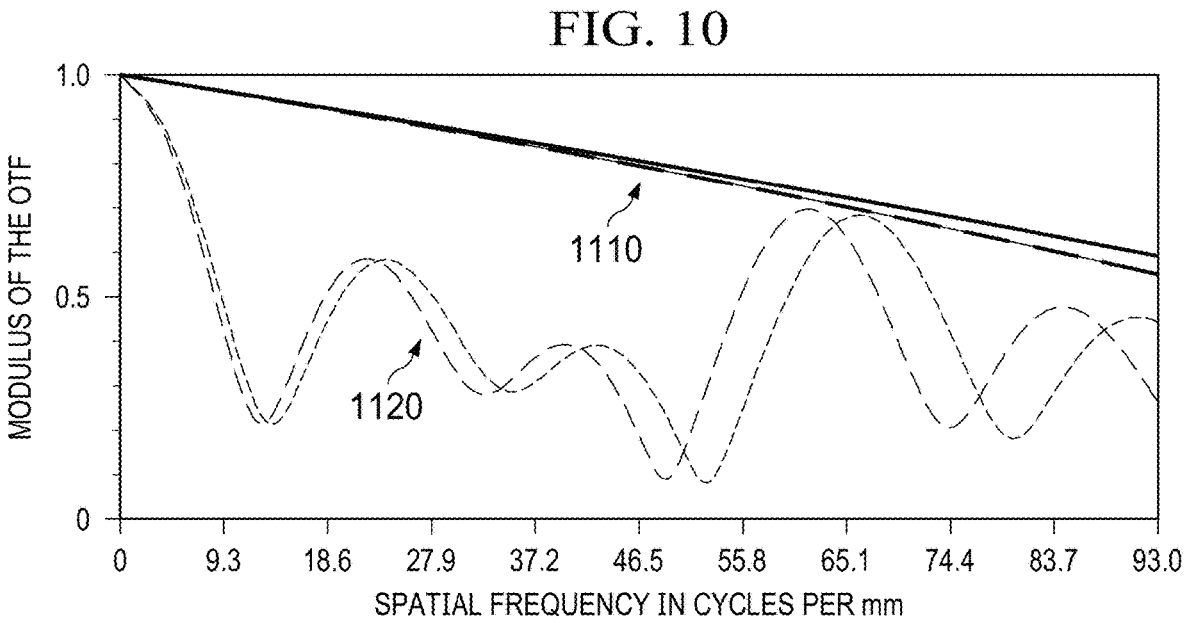
FIG. 10 is a graph representing an OTF of combined color modes of the apparatus of FIGS. 6A-B, in accordance with various examples.

FIG. 10 is a graph representing an OTF of the combined color modes of the apparatus 600 or 700, in accordance with various examples. The color modes include the blue, green, and red color modes in the modulated light 120, at the wavelengths 486 nm, 587 nm, and 656 nm, respectively. The color modes can be transmitted in the modulated light 120 simultaneously or by time multiplexing the one or more light sources 150. The SLM 601 or 701 is a DMD with adjustable micromirrors. The combined color modes in the modulated light 120 provide a white color mode in the projected image, also referred to herein as a red, green, and blue (RGB) mode.

In the graph of FIG. 10, the x-axis represents the range of spatial frequencies in the image, and the y-axis represents the MTF in the displayed image. The curves 1110 correspond to rays of the RGB mode in the modulated light 120, including rays with 0°, +25°, and −25° fields of view. The curves 1110 show a decrease in contrast level for higher spatial frequencies, where the contrast level at the highest spatial frequency is above 0.5. The graph also includes the curves 1120 for other rays of the modulated light 120 in the RGB mode. The curves 1120 show varying contrast in a nonlinear manner across the range of spatial frequencies from 0 to 93 cycles/mm. This nonlinear relation between contrast levels and spatial frequencies is mainly caused by lateral color aberration.

Figure 11:
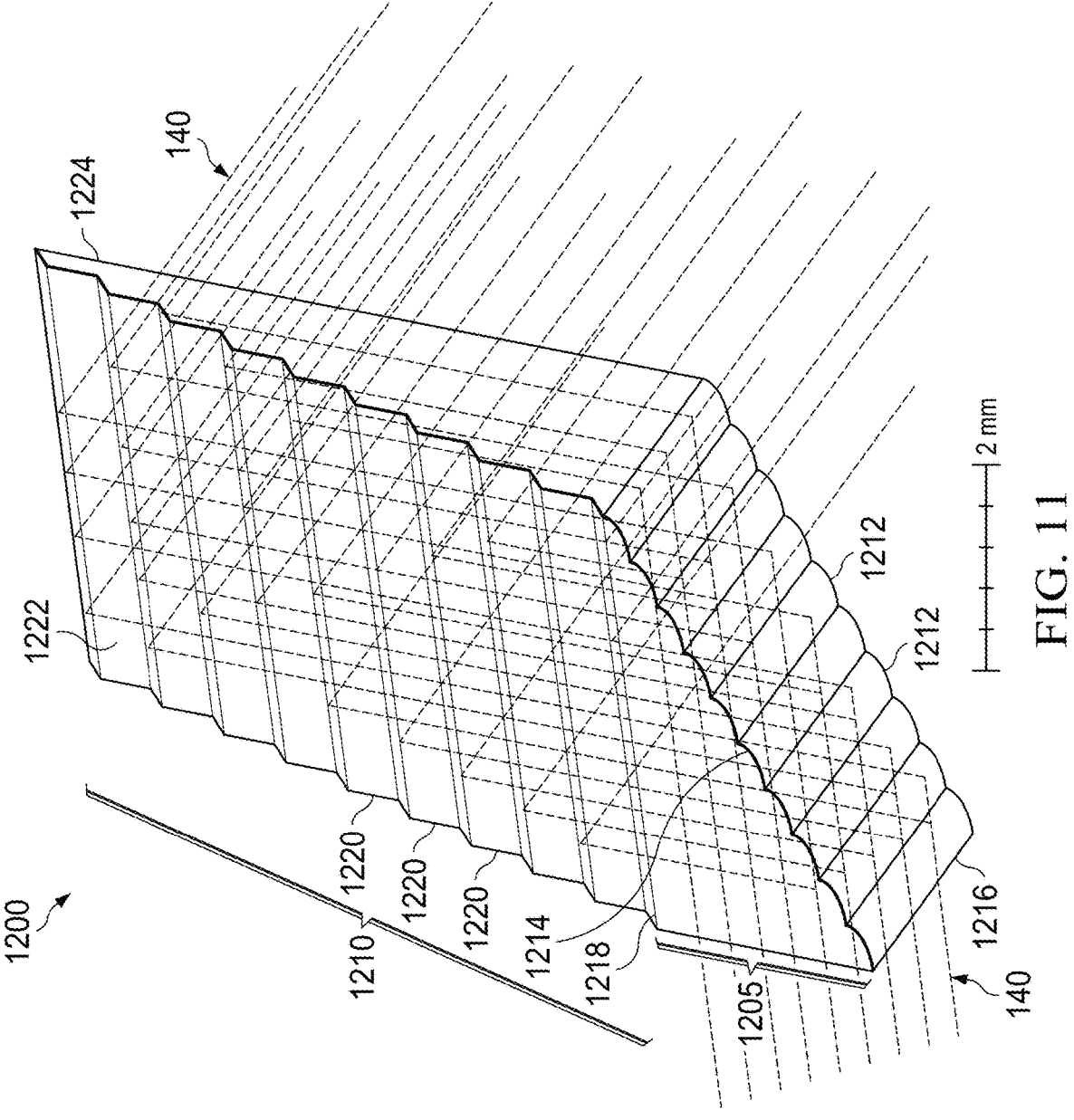
FIG. 11 is a diagram of an optical waveguide coupler for a near eye display engine, in accordance with various examples.

FIG. 11 is a diagram of an optical waveguide coupler 1200 for a near eye display engine in accordance with various examples. For example, the optical waveguide coupler 1200 can be coupled to the near eye display engine 110 and to the one or more light sources 150 of the near eye display 100. The near eye display engine 110 can be any of the apparatuses 200, 300, 400, 500, 600, or 700. The optical waveguide coupler 1200 is an optical structure configured to confine, direct, and transfer the incident light 140 from the one or more light sources 150 to a first prism in the near eye display engine 110. For example, the optical waveguide coupler 1200 can be the optical waveguide coupler 216 in the apparatus 200 which is coupled to the first prism 218 and the optical fiber 226, or the optical waveguide coupler 316 in the apparatus 300 which is coupled to the first prism 318 and the one or more light sources 350.

The optical waveguide coupler 1200 includes staircase waveguides with wedge surfaces including steps configured to uniformly distribute the color modes of the incident light 140 in an illumination area on the SLM the near eye display engine 110. The optical waveguide coupler 1200 includes a first staircase waveguide 1205 and a second staircase waveguide 1210 coupled to the first staircase waveguide 1205. The first staircase waveguide 1205 and second staircase waveguide 1210 can be parts of the same optical structure of the optical waveguide coupler 1200 or can be two different structures that are coupled to each other to form the optical waveguide coupler 1200. The first staircase waveguide 1205 includes first steps 1212 on a first wedge surface 1214 of the first staircase waveguide 1205. The first staircase waveguide 1205 also includes an input side 1216, which is configured to receive the incident light 140 from one or more light sources, such as the one or more light sources 150. For example, the input side 1216 can be optically coupled to the optical fiber 226 in the apparatus 200 or to the one or more light sources 350 without an optical fiber in the apparatus 300.

The first steps 1212 on the first wedge surface 1214 are configured to direct by TIR the rays of incident light 140, for the different color modes, from the input side 1216 to an interface side 1218 coupled to the second staircase waveguide 1210. The rays of the color modes of the of incident light 140 are also directed by TIR from the sidewalls of the first staircase waveguide 1205 to the first steps 1212 on the first wedge surface 1214. In the first staircase waveguide 1205, the interface side 1218 and the input side 1216 are oriented orthogonal to each other and are both facing the first steps 1212 and the first wedge surface 1214. This allows directing the rays of incident light 140 in the first staircase waveguide 1205 by 90° from the input side 1216 to the second staircase waveguide 1210.

The second staircase waveguide 1210 is configured to receive the rays of incident light 140 from first staircase waveguide 1205 through the interface side 1218. The second staircase waveguide 1210 includes second steps 1220 on a second wedge surface 1222. The second steps 1220 on the second wedge surface 1222 are configured to direct by TIR the rays of the color modes of the incident light 140 from the interface side 1218 to an output side 1224 of the second staircase waveguide 1210. The rays of the color modes are also directed by TIR from the sidewalls of the second staircase waveguide 1210 to the second steps 1220 on the second wedge surface 1222. The output side 1224 is configured to transmit the incident light 140 to the near eye display engine 110. For example, the output side 1224 can be optically coupled to the first prism 218 in the apparatus 200 or to the first prism 318 in the apparatus 300. In the second staircase waveguide 1210, the output side 1224 and the interface side 1218 are oriented orthogonal to each other and are both facing the second steps 1220 and the second wedge surface 1222. This allows directing the rays of incident light 140 in the second staircase waveguide 1210 by 90° from the first staircase waveguide 1205 to the output side 1224.

The first steps 1205 and the second steps 1220 form multiple reflector surfaces of the first staircase waveguide 1205 and the second staircase waveguide 1210, respectively. In the first staircase waveguide 1205, the first steps 1212 on the first wedge surface 1214 provide a first effective reflective surface to the incident light 140, such as from the one or more light sources 150. In the second staircase waveguide 1210, the second steps 1220 on the second wedge surface 1222 also provide a second effective reflective surface to the incident light 140 from the first staircase waveguide 1205. The first and second effective reflective surfaces are configured by the first steps 1212 and second steps 1220, respectively, to redistribute the rays of the different color modes in the incident light 140 to provide a more uniform distribution of the color modes across the beam of the incident light 140 at the output side 1224. This also increases the uniform distribution of the color modes in the illumination area of the incident light 140 on the SLM, in the near eye display engine 110 and accordingly in the modulated light 120, which increase the quality of the image projected by the near eye display engine 110. Increasing the size of the effective reflective surfaces can also increase the size of the beam of incident light 140 at the output side 1224, and accordingly the size of the illumination area on the SLM. For example, as shown in FIG. 11, the size of the second wedge surface 1222 is larger than the first wedge surface 1214, which expands the beam of the incident light 140 at the output side 1224. Increasing the number of the steps of the wedge surfaces or the reflector surfaces can also increase the uniform distribution of the different color modes in the illumination area of the SLM.

In the optical waveguide coupler 1200, the first steps 1212 on the first wedge surface 1214 are oriented orthogonal to the second steps 1220 on the second wedge surface 1222, which effectively folds the optical path of the incident light 140 into two orthogonal planes. For example, folding the optical path of the incident light 140 in the optical waveguide coupler 1200 reduces the length of the optical path required to direct the rays of incident light 140 from the one or more light sources 150 to the near eye display engine 110. As shown in FIG. 11, the dimensions of the components of the optical waveguide coupler 1200 can be within 2 mm to 20 mm. Such dimensions can allow placing the one or more light sources 150 and the near eye display engine 110, which are optically coupled by the optical waveguide coupler 1200, in close proximity (e.g., within few tens of millimeters or few centimeters) in the near eye display 100 or the wearable device 105.

Figure 12:
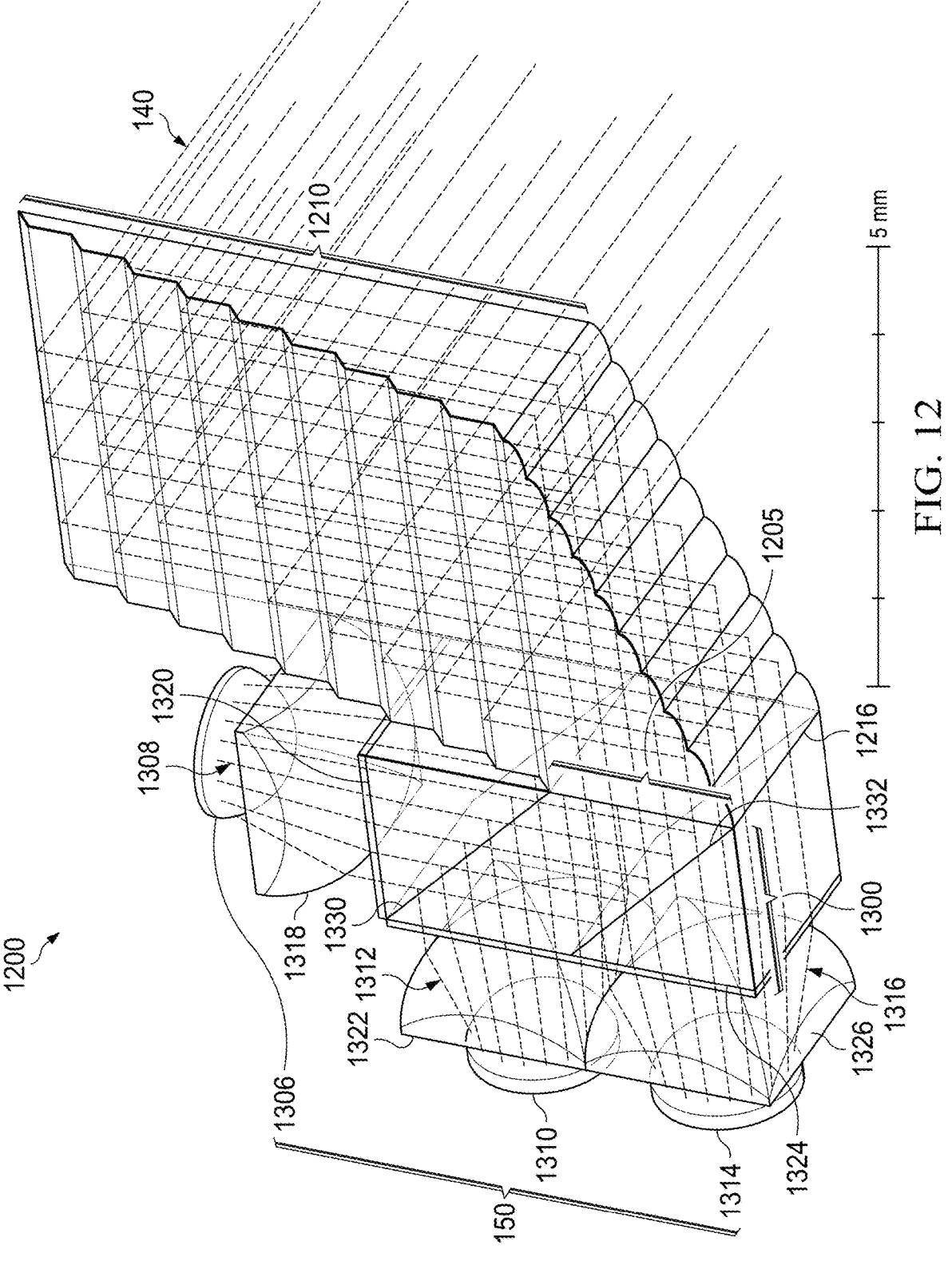
FIG. 12 is a diagram of an optical waveguide coupler with a waveguide of partial reflectors for one or more light sources, in accordance with various examples.

FIG. 12 is a diagram of the optical waveguide coupler 1200 of FIG. 11 with a waveguide 1300 of partial reflectors for the one or more light sources 150, in accordance with various examples. As shown in FIG. 12, the optical waveguide coupler 1200 can be optically coupled to the one or more light sources 150 by the waveguide 1300 without an optical fiber. For example, the optical waveguide coupler 1200 can be the optical waveguide coupler 316 and the waveguide 1300 can be the waveguide 328, which is coupled to the optical waveguide coupler 316 in the apparatus 300. In FIG. 12, the waveguide 1300 is coupled to the optical waveguide coupler 1200 through the input side 1216 of the first staircase waveguide 1205, and is optically coupled on other sides to the one or more light sources 150.

The one or more light sources 150 can include light sources such as lasers or LEDs configured to transmit light with respective color modes. For example, the one or more light sources 150 include a first LED 1306 configured to transmit blue light 1308 for a blue color mode, a second LED 1310 configured to transmit green light 1312 for a green color mode, and a third LED 1314 configured to transmit red light 1316 for a red color mode. The one or more light sources 150 can be optically coupled through respective lenses to one or more sides or facets of the waveguide 1300. For example, the first LED 1306 is optically coupled, through a first lens 1318, to a first side 1320 of the waveguide 1300. The second LED 1310 is optically coupled, through a second lens 1322, to a second side 1324 of the waveguide 1300. The third LED 1314 is optically coupled, through a third lens 1326, also to the second side 1324. The first lens 1318 is configured to collimate the blue light 1308, which is transmitted from the first LED 1306 to the waveguide 1300 through the first side 1320. The second lens 1322 is configured to collimate the green light 1312, which is transmitted from the second LED 1310 to the waveguide 1300 through the second side 1324. The third lens 1326 is configured to collimate the red light 1316, which is transmitted from the third LED 1314 to the waveguide 1300 also through the second side 1324.

The waveguide 1300 includes partial reflector surfaces that receive respective rays of light for each color mode from the one or more light sources 150, and combine and direct the rays of the color modes to the first staircase waveguide 1205 in the optical waveguide coupler 1200 to form the incident light 140. The incident light 140 is directed by the first staircase waveguide 1205 to the second staircase waveguide 1210, which in turn directs the incident light 140 to a first prism in the near eye display engine 110. In examples, if two sides of the waveguide 1300 are optically coupled to the one or more light sources 150, the waveguide 1300 can include a first partial reflector surface 1330 and a second partial reflector surface 1332. The first partial reflector surface 1330 and the second partial reflector surface 1332 have tilted surfaces which are arranged in sequence along the waveguide 1300. The tilted surfaces are parallel partial reflector surfaces and have the same size along the waveguide 1300. The first partial reflector surface 1330 is configured to direct the blue light 1308 from the first side 1320 with the green light 1312 from the second side 1324 to the second partial reflector surface 1332. Accordingly, the first partial reflector surface 1330 is configured to transmit, at a side of the first partial reflector surface 1330 facing the first side 1320, the blue light 1308 to the second partial reflector surface 1332 and reflect the green light 1312 to the second partial reflector surface 1332 at an opposite of the first partial reflector surface 1330 side facing the second side 1324.

The second partial reflector surface 1332 is configured to direct the red light 1316 from the second side 1324 and direct the blue light 1308 with the green light 1312 from the first partial reflector surface 1330 to the input side 1216 of the first staircase waveguide 1205. Accordingly, the second partial reflector surface 1332 is configured to transmit, at a side of the second partial reflector surface 1332 facing the second side 1324, the red light 1316 to the input side 1216 and reflect the blue light 1308 with the green light 1312 to the input side 1216 at an opposite side of the second partial reflector surface 1332 facing the first side 1320. In the waveguide 1300, the number of partial reflector surfaces can depend on the number of sides of the waveguide 1300 that are coupled to the LEDs or other light sources 150. In examples, the first LED 1306, second LED 1310, and third LED 1314 can be optically coupled to the same side or to three respective sides of the waveguide 1300, and the number of partial reflector surfaces can be different than two.

Figure 13:
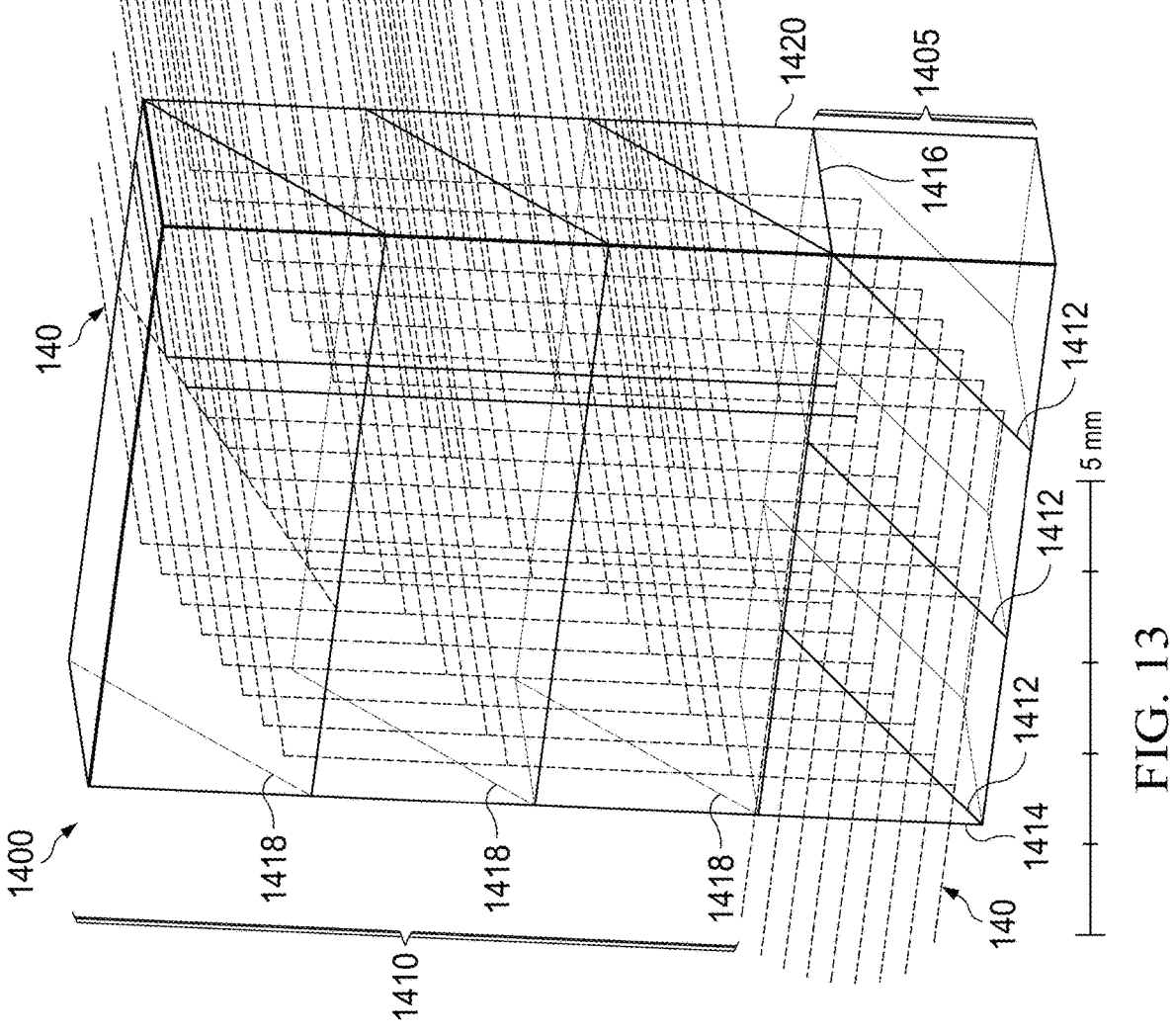
FIG. 13 is a diagram of an optical waveguide coupler for a near eye display engine, in accordance with various examples.

FIG. 13 is a diagram of an optical waveguide coupler 1400 for a near eye display engine in accordance with various examples. For example, the optical waveguide coupler 1400 can be coupled to the near eye display engine 110 and to the one or more light sources 150 of the near eye display 100. The near eye display engine 110 can be any of the apparatuses 200, 300, 400, 500, 600, or 700. The optical waveguide coupler 1400 is configured to direct the incident light 140 from the one or more light sources 150 to a first prism in the near eye display engine 110. For example, the optical waveguide coupler 1400 can be the optical waveguide coupler 216 in the apparatus 200 or the optical waveguide coupler 316 in the apparatus 300.

The optical waveguide coupler 1400 includes parallel partial reflector surfaces configured to uniformly distribute the color modes of the incident light 140 in an illumination area on the SLM the near eye display engine 110. The optical waveguide coupler 1400 includes a first waveguide 1405 of partial reflectors and a second waveguide 1410 of partial reflectors coupled to the first waveguide 1405. The first waveguide 1405 and second waveguide 1410 can be parts of the same optical structure of the optical waveguide coupler 1400 or can be two different structures that are coupled to each other to form the optical waveguide coupler 1400. As shown in FIG. 13, the first waveguide 1405 includes first partial reflector surfaces 1412 with tilted surfaces which are arranged in sequence along the first waveguide 1405. The tilted surfaces of the first partial reflector surfaces 1412 are parallel partial reflector surfaces and have the same size along the first waveguide 1405.

An input side 1414 of the first waveguide 1405 is configured to receive rays of incident light 140, for the different color modes, such as from the one or more light sources 150. The first partial reflector surfaces 1412 in the first waveguide 1405 are configured to reflect a portion of the rays to an interface side 1416 between the first waveguide 1405 and the second waveguide 1410. For example, the input side 1414 can be optically coupled to the optical fiber 226 in the apparatus 200 or to the one or more light sources 350 without an optical fiber in the apparatus 300. The input side 1414 and the interface side 1416 can be oriented orthogonal to each other and are both facing the first partial reflector surfaces 1412. This allows directing the rays of the color modes of the incident light 140 in the first waveguide 1405 by 90° from the input side 1414 to the interface side 1416. The first partial reflector surfaces 1412 are also configured to transmit a second or remaining portion of the rays to the next first partial reflector surfaces 1412 in the sequence of first partial reflector surfaces 1412 along the first waveguide 1405. The partial reflection and transmission of the rays in the sequence of first partial reflector surfaces 1412 in the first waveguide 1405 causes the uniform distribution of the rays of the different color modes of the incident light 140 across an interface side 1416. The rays of the color modes are also directed by TIR from the sidewalls of the first waveguide 1405 to the first partial reflector surfaces 1412.

The second waveguide 1410 is configured to receive the rays of the color modes of the incident light 140 from first waveguide 1405 through the interface side 1416. The second waveguide 1410 includes second partial reflector surfaces 1418 with tilted surfaces which are arranged in sequence along the second waveguide 1410. The tilted surfaces of the second partial reflector surfaces 1418 are parallel partial reflector surfaces and have the same size in a parallel arrangement along the second waveguide 1410. The second partial reflector surfaces 1418 are configured to reflect a portion of the rays of the color modes from the first waveguide 1405, which are received at the interface side 1416, to an output side 1420 of the optical waveguide coupler 1400. For example, the output side 1420 can be optically coupled to the first prism 218 in the apparatus 200 or to the first prism 318 in the apparatus 300. The interface side 1416 and the output side 1420 can be oriented orthogonal to each other and are both facing the second partial reflector surfaces 1418. This allows directing the rays of the color modes of the incident light 140 in the second waveguide 1410 by 90° from the interface side 1416 to the output side 1420. The second partial reflector surfaces 1418 are also configured to transmit a second or remaining portion of the rays to the next second partial reflector surfaces 1418 in the sequence of second partial reflector surfaces 1418 along the second waveguide 1410. The partial reflection and transmission of the rays by the sequence of second partial reflector surfaces 1418 in the second waveguide 1410 causes the uniform distribution of the rays of the different color modes across an output side 1420. The rays of the color modes are also directed by TIR from the sidewalls of the second waveguide 1410 to the second partial reflector surfaces 1418.

Increasing the size of the second partial reflector surfaces 1418 along the second waveguide 1410 can increase the size of the beam of incident light 140 at the output side 1420, and accordingly the size of the illumination area on an SLM in the near eye display engine 110. For example, as shown in FIG. 13, the size of the second partial reflector surfaces 1418 is larger than the first partial reflector surfaces 1412, which expands the beam of the incident light 140 at the output side 1420. The first partial reflector surfaces 1412 and the second partial reflector surfaces 1418 form multiple reflector surfaces of the first waveguide 1405 and the second waveguide 1410, respectively. Increasing the number of the reflector surfaces or the second partial reflector surfaces 1418 in the second waveguide 1410 and/or the first partial reflector surfaces 1412 in the first waveguide 1405 can also increase the uniform distribution of the different color modes in the illumination area of the SLM.

In the optical waveguide coupler 1400, the second partial reflector surfaces 1418 are oriented orthogonal to the first partial reflector surfaces 1412, which effectively folds the optical path of the incident light 140 into two orthogonal planes, and reduces the length of the optical path required to direct the rays of incident light 140 from the one or more light sources 150 to the near eye display engine 110. As shown in FIG. 13, the dimensions of the components of the optical waveguide coupler 1400 can be within 5 mm to 10 mm. Such dimensions can allow placing the one or more light sources 150 and the near eye display engine, which are optically coupled by the optical waveguide coupler 1400, in close proximity (e.g., within few tens of millimeters or few centimeters) in the near eye display 100 or the wearable device 105.

Figure 14:
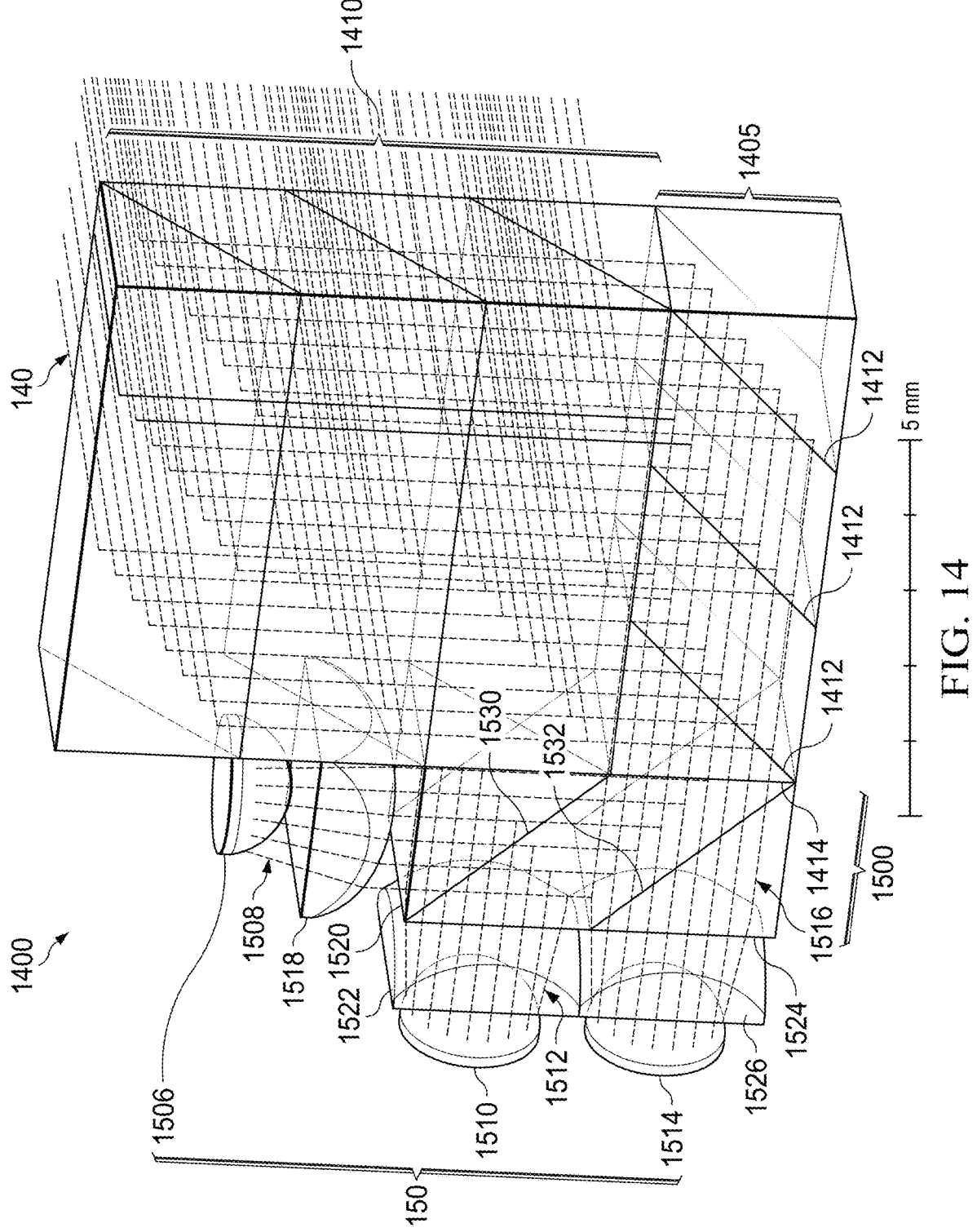
FIG. 14 is a diagram of an optical waveguide coupler with a waveguide of partial reflectors for one or more light sources, in accordance with various examples.

FIG. 14 is a diagram of the optical waveguide coupler 1400 of FIG. 13 with a third waveguide 1500 of partial reflectors for the one or more light sources 150, in accordance with various examples. As shown in FIG. 14, the optical waveguide coupler 1400 can be optically coupled to the one or more light sources 150 by the third waveguide 1500 without an optical fiber. For example, the optical waveguide coupler 1400 can be the optical waveguide coupler 316 and the third waveguide 1500 can be the waveguide 328, which is coupled to the optical waveguide coupler 316 in the apparatus 300. In FIG. 14, the third waveguide 1500 is coupled to the optical waveguide coupler 1400 through the input side 1414 of the first waveguide 1405, and is optically coupled on other sides to the one or more light sources 150.

The one or more light sources 150 include light sources such as lasers or LEDs configured to transmit light with respective color modes. For example, the one or more light sources 150 include a first LED 1506 configured to transmit red light 1508 for a red color mode, a second LED 1510 configured to transmit blue light 1512 for a blue color mode, and a third LED 1514 configured to transmit green light 1516 for a green color mode. The one or more light sources 150 can be optically coupled through respective lenses to one or more sides or surfaces of the third waveguide 1500. For example, the first LED 1506 is optically coupled, through a first lens 1518, to a first side 1520 of the third waveguide 1500. The second LED 1510 is optically coupled, through a second lens 1522, to a second side 1524 of the third waveguide 1500. The third LED 1514 is optically coupled, through a third lens 1526, also to the second side 1524. The first lens 1518 is configured to collimate the red light 1508, which is transmitted from the first LED 1506 to the third waveguide 1500 through the first side 1520. The second lens 1522 is configured to collimate the blue light 1512, which is transmitted from the second LED 1510 to the third waveguide 1500 through the second side 1524. The third lens 1526 is configured to collimate the green light 1516, which is transmitted from the third LED 1514 to the third waveguide 1500 also through the second side 1524.

The third waveguide 1500 includes partial reflector surfaces that receive respective rays of light for each color mode from the one or more light sources 150, and combine and direct the rays of the color modes to the first waveguide 1405 to form the incident light 140. The incident light 140 is directed by the first waveguide 1405 to the second waveguide 1410, which in turn directs the incident light 140 to a first prism in the near eye display engine. In examples, if two sides of the third waveguide 1500 optically are coupled to the one or more light sources 150, the third waveguide 1500 can include a first partial reflector surface 1530 and a second partial reflector surface 1532. As shown in FIG. 14, the first partial reflector surface 1530 and the second partial reflector surface 1532 have tilted surfaces which are arranged in sequence along the third waveguide 1500. The tilted surfaces are parallel surfaces and have the same size along the third waveguide 1500. The partial reflector surfaces can be tilted in the opposite direction to the first partial reflector surfaces 1412 in the first waveguide 1405.

The first partial reflector surface 1530 in the third waveguide 1500 is configured to direct the red light 1508 from the first side 1520 and the blue light 1512 from the second side 1524 to the second partial reflector surface 1532. Accordingly, the first partial reflector surface 1530 is configured to transmit, at a side of the first partial reflector surface 1530 facing the first side 1520, the red light 1508 to the second partial reflector surface 1532 and reflect the blue light 1512 to the second partial reflector surface 1532 at an opposite side of the first partial reflector surface 1530 facing the second side 1524. The second partial reflector surface 1532 is configured to direct the green light 1516 from the second side 1524 and direct the red light 1508 with the blue light 1512 from the first partial reflector surface 1530 to the input side 1414 of the first waveguide 1405. Accordingly, the second partial reflector surface 1532 is configured to transmit, at a side of the second partial reflector surface 1532 facing the second side 1524, the green light 1516 to the input side 1414 and reflect the red light 1508 with the blue light 1512 to the input side 1414 at an opposite side of the second partial reflector surface 1532 facing the first side 1520. In the third waveguide 1500, the number of partial reflector surfaces can depend on the number of sides of the third waveguide 1500 that are coupled to the LEDs or other light sources 150. In examples, the first LED 1506, second LED 1510, and third LED 1514 can be optically coupled to the same side or to three respective sides of the third waveguide 1500, and the number of partial reflector surfaces can be different than two.

Figure 15A:
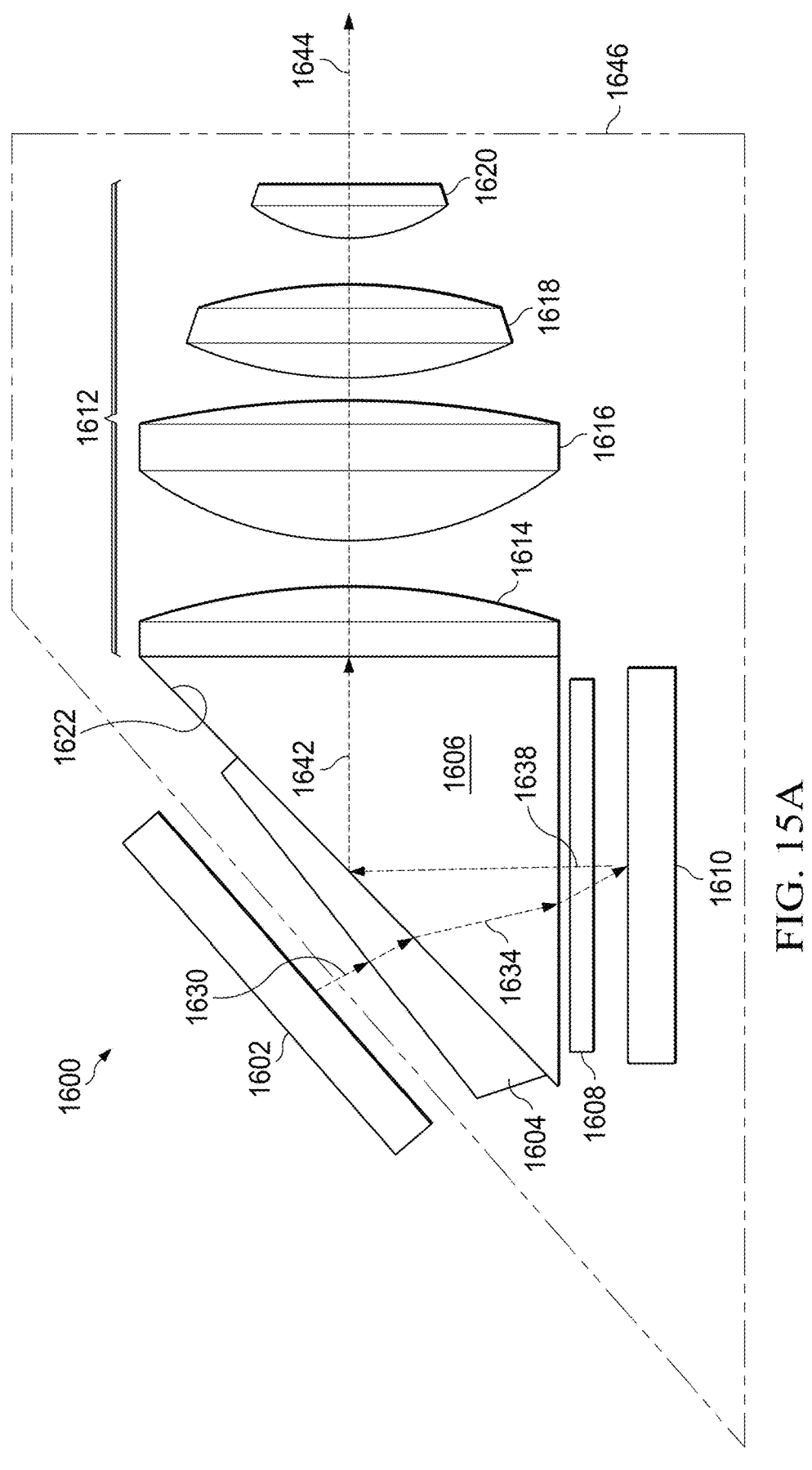
FIGS. 15A-C illustrate an example light source and optical engine.
Figure 15B:
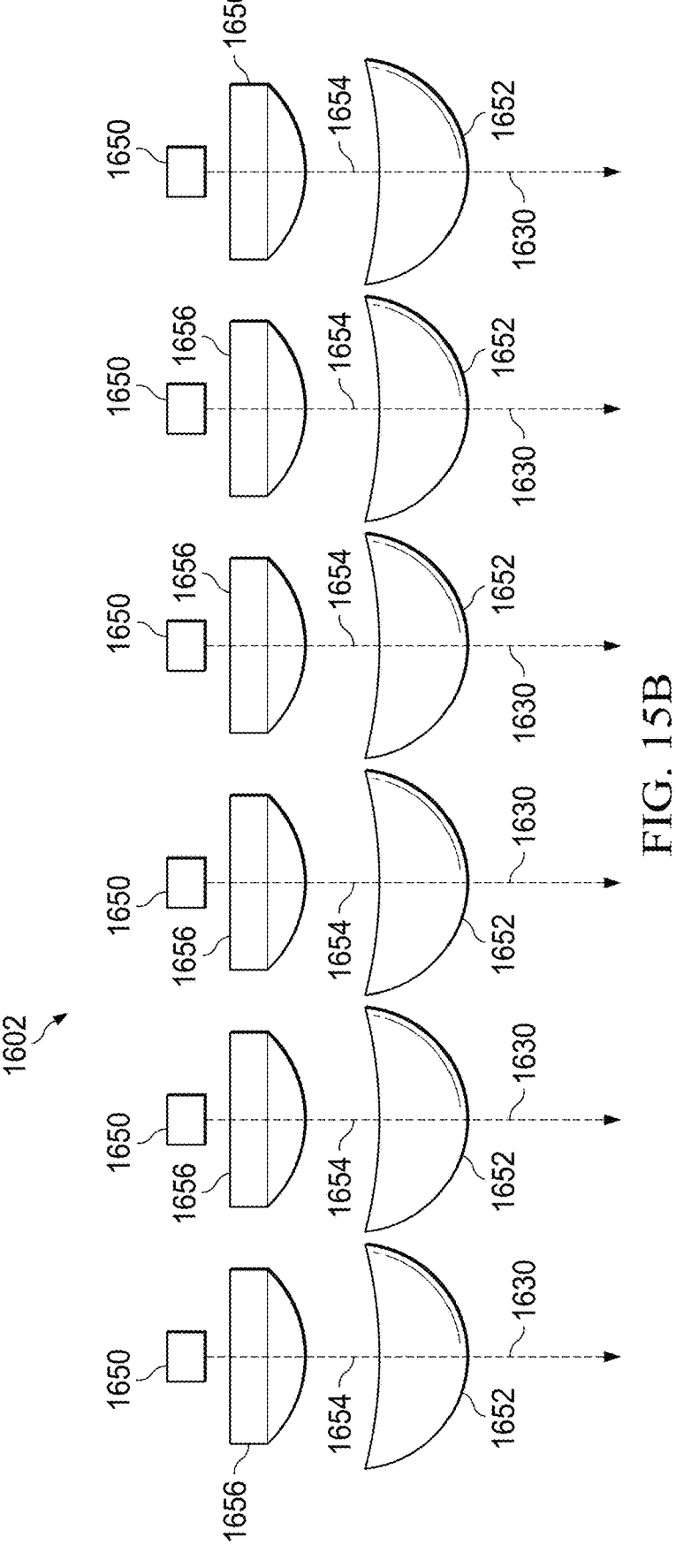
Figure 15C:
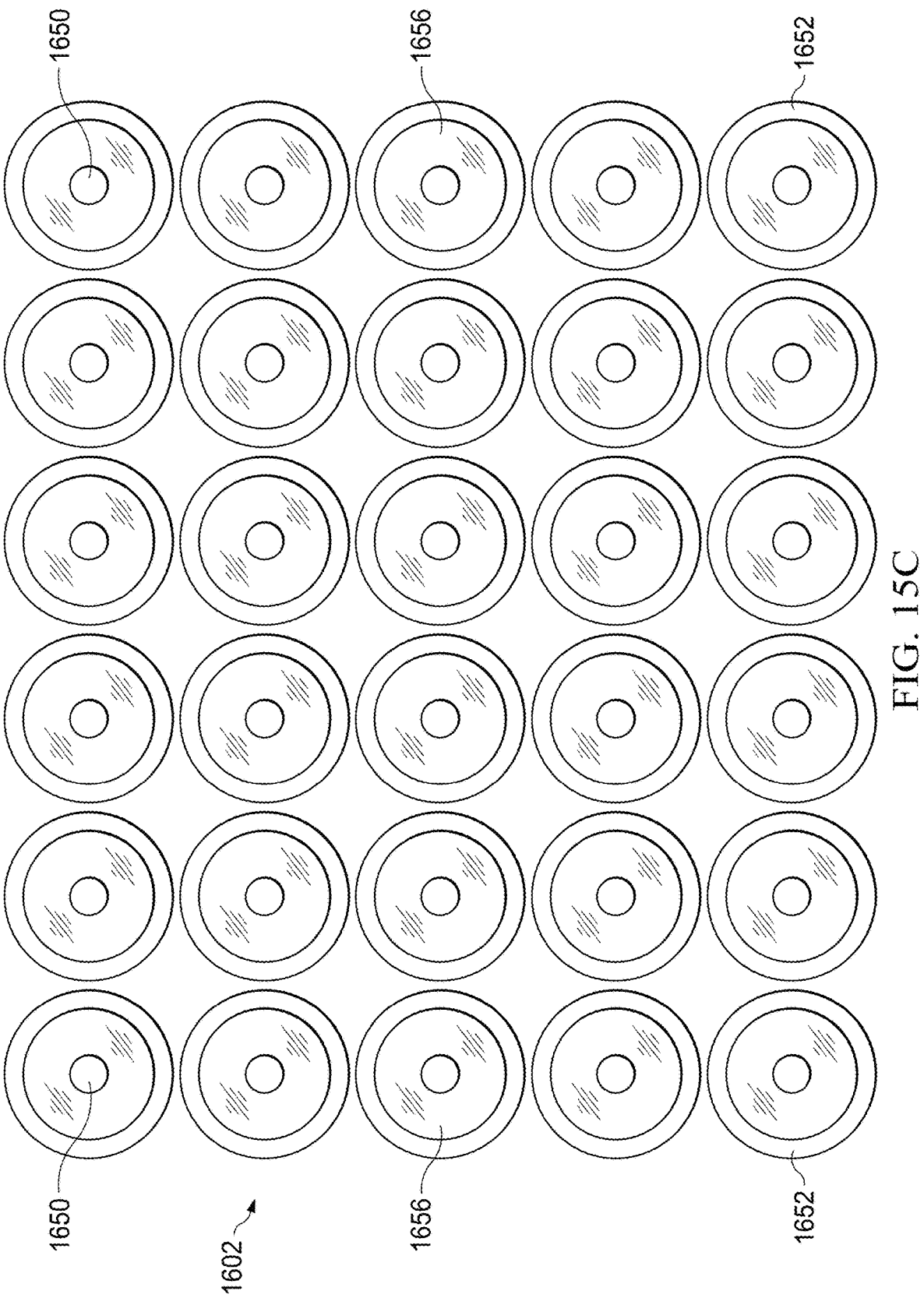

FIGS. 15A-C illustrate an example apparatus 1600 containing a backlight module 1602 and near eye display engine 1646. FIG. 15A illustrates a backlight module 1602 optically coupled to the near eye display engine 1646. The backlight module 1602 may be an example of the one or more light sources 150 illustrated in FIGS. 1A and 1B, and the near eye display engine 1646 may be an example of the near eye display engine 110 illustrated in FIGS. 1A and 1B.

FIG. 15B illustrates a side view of the backlight module 1602 and FIG. 15C illustrates a top view of an example of the backlight module 1602. The backlight module 1602 contains a light source array 1650 optically coupled to a lens array 1656 and a lens array 1652. Each light source of the light source array 1650 is optically coupled to a corresponding lens of lens array 1656 and a corresponding lens of lens array 1652. The light source array 1650 produces initial light 1654. The lens array 1656 and the lens array 1652 focus the initial light 1654 to produce module light 1630. The light source array 1650 may by a mini light emitting diode (LED) array, a microLED array, a laser diode array, or a fiber light source array. The light source elements may be the same color, may be different color, or may contain multiple sub-element light emitters with multiple colors. FIG. 15C illustrates the light source array 1650 as being a 5 by 6 light source array, but the light source array 1650 may have different dimensions. In an example, the backlight module 1602 has a small size. In an example, a portion of the light sources of the light source array 1650 are turned off to save energy. In another example, a portion of the light sources of the light source array 1650 are turned off to increase the dynamic range to produce high dynamic range (HDR) images. The lens array 1656 collects and collimates the light from the light source array 1650 to produce the initial light 1654. The lens array 1652 further collimates the initial light 1654 to produce the module light 1630 to improve coupling efficiency.

The near eye display engine 1646 contains a cover prism 1604, a prism 1606, cover glass 1608, SLM 1610, and eyepiece optics 1612. The cover prism 1604 directs the module light 1630 towards the prism 1606. In an example, the prism 1606 is a reverse total internal reflection (RTIR) right angle prism. The prism 1606 directs the incident light 1634 towards the SLM 1610. The incident light 1634 passes through the cover glass 1608 to the SLM 1610. The SLM 1610 modulates the incident light 1634 to produce modulated light 1638. The modulated light 1638 passes through the cover glass 1608 and the prism 1606 and is reflected off of surface 1622 to produce reflected light 1642. The reflected light 1642 passes through the prism 1606 and is projected by the eyepiece optics 1612 to produce image light 1644. In an example, the eyepiece optics 1612 contain lens 1614, lens 1616, lens 1618, and lens 1620, but other examples may contain a different number of lens elements. The eyepiece optics 1612 redirect the reflected light 1642 to form a virtual image of the SLM 1610. In an example, the lens element 1614 is cemented to the prism 1606. The image light 1644 may proceed to an optical combiner, such as the optical combiner 130 illustrated in FIGS. 1A and 1B, and to an HOE. In an example, the light source array 1650 and the SLM 1610 are coupled to a controller, such as the controllers 160 illustrated in FIGS. 1A and 1B. In an example, a portion of the light sources of the light source array 1650 corresponding to regions of the image produced by the SLM 1610 that are dark are dimmed or turned off to save energy. In another example, a portion of the light sources of the light source array 1650 corresponding to regions of the image produced by the SLM 1610 that are dark are dimmed or turned off to increase the dynamic range to produce high dynamic range (HDR) images.

Figure 16A:
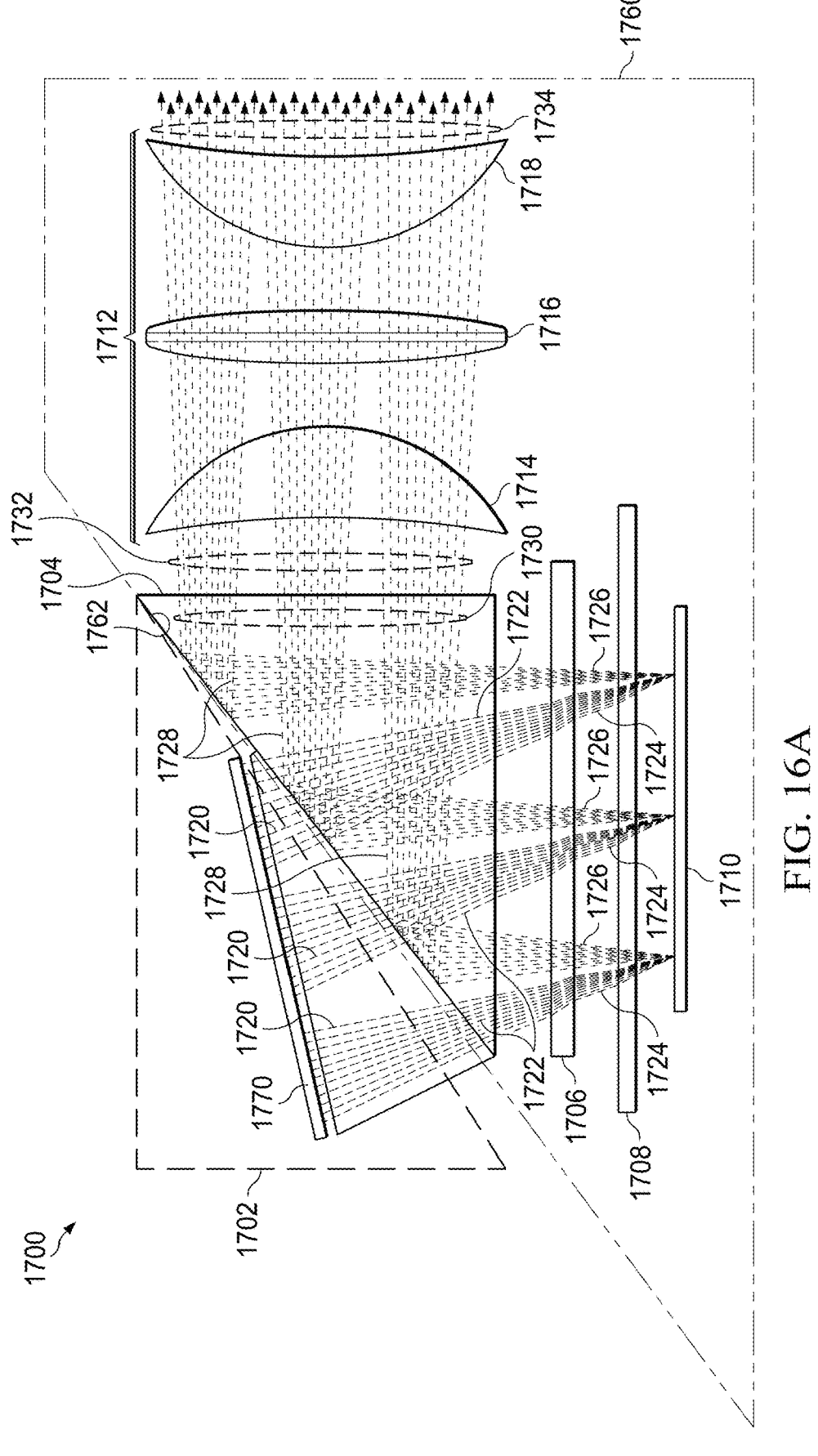
FIGS. 16A-B illustrate an example light source and optical engine.
Figure 16B:
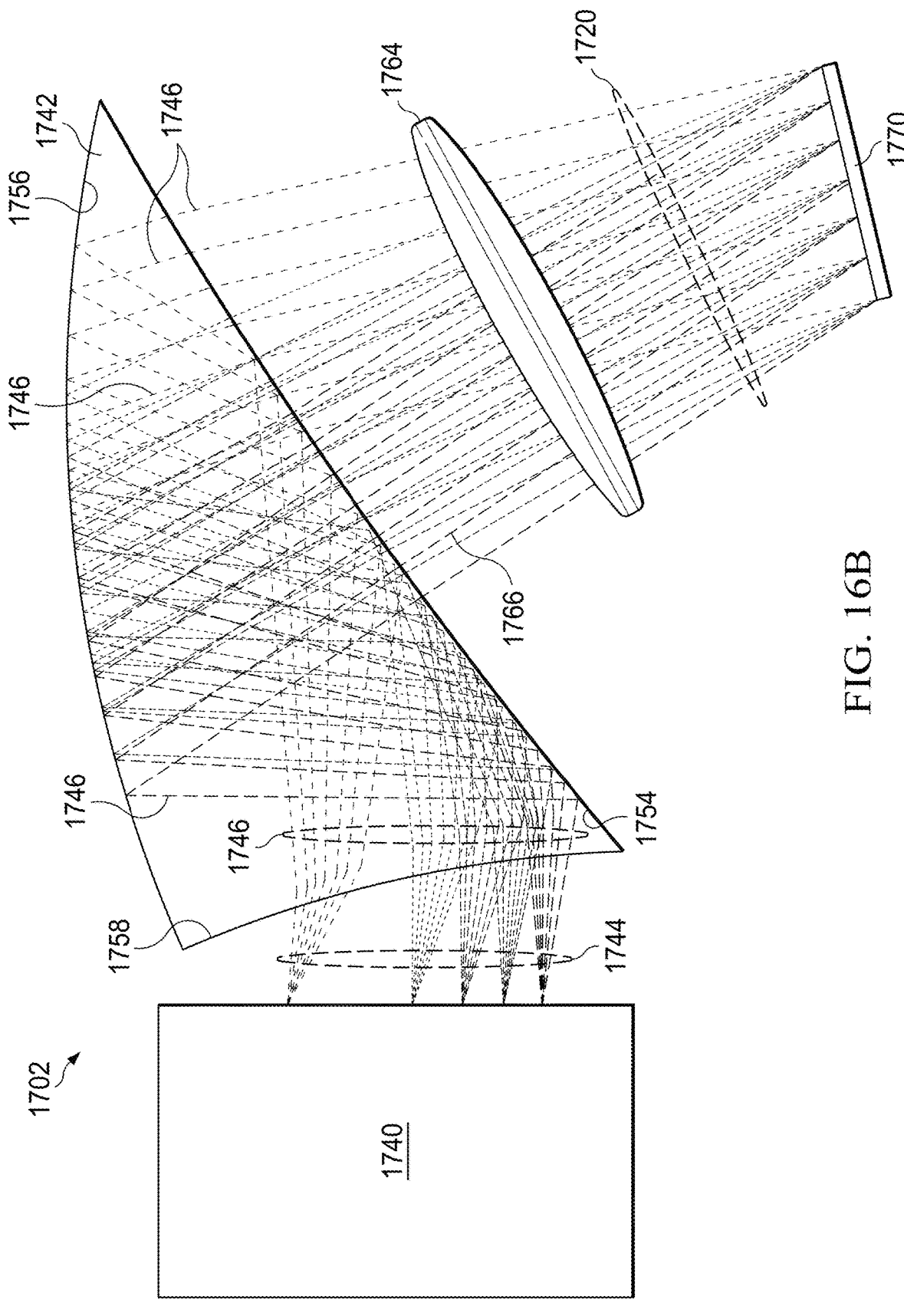

FIGS. 16A-B illustrate an example apparatus 1700 containing a backlight module 1702 and a near eye display engine 1760. The backlight module 1702 may be an example of the one or more light sources 150 illustrated in FIGS. 1A-B. The near eye display engine 1760 may be an example of the near eye display engine 1760 illustrated in FIGS. 1A-B. FIG. 16A illustrates the backlight module 1702 optically coupled to the near eye display engine 1760. The backlight module 1702 produces light 1720.

FIG. 16B illustrates an example of the backlight module 1702. The backlight module contains a light source 1740 which produces initial light 1744. The light source 1740 may contain red, green, and blue LEDs, a laser with a phosphor, or a fiber light source. Freeform optics 1742 is optically coupled to the light source 1740. In an example, the freeform optics 1742 is a single piece of plastic. The freeform optics 1742 may be small in size and low in cost. The freeform optics 1742 has surface 1754, surface 1756, and surface 1758. The initial light 1744 enters the freeform optics 1742 through the surface 1758. The freeform light 1746 is reflected off of the surface 1754 towards the surface 1756. Then, the freeform light 1746 is reflected off of the surface 1756. After being reflected off of the surface 1756, the freeform light 1746 is transmitted through the surface 1754 to produce the light 1766. In an example the light 1766 is focused by the lens element 1764 to produce module light 1720. The lens element 1764 may be a single lens or a lens array which improves performance. The lens element 1764 improves uniformity on the SLM 1710. In an example, the lens element 1764 is a lens array that homogenizes the light distribution in the angular space. In some examples, the lens element 1764 is not used. The light 1720 passes through region 1770.

The module light 1720 enters the near eye display engine 1760. The near eye display engine 1760 contains a prism 1704, a plate 1706, cover glass 1708, an SLM 1710, and eyepiece optics 1712. The light passes through the surface 1762 of the prism 1704 and exits the prism 1704 as light 1724. In an example, the prism 1704 is an RTIR right angle prism. The light 1724 passes through the plate 1706 and the cover glass 1708 to the SLM 1710. In this example, the plate 1706 is a movable plate for extended pixel resolution (XPR). In some examples, the plate 1706 is not used. The SLM 1710 modulates the light 1724 to produce modulated light 1726. The modulated light 1726 passes through the cover glass

1708, the plate 1706, and the prism 1704, and is reflected by the surface 1762 of the prism 1704 to produce reflected light 1730. The reflected light 1730 exits the prism 1704 as eyepiece light 1732. The Eyepiece light 1732 passes through the eyepiece optics 1712 to produce image light 1734. The eyepiece optics 1712 projects an image with the image light 1734. In an example, the eyepiece optics 1712 contains a lens 1714, a lens 1716, and a lens 1718, but in other examples a different number of lenses may be present in the eyepiece optics 1712. The eyepiece optics redirect the light rays to form a virtual image of the SLM 1710. In an example, the exit light 1734 proceeds to an optical combiner, such as the optical combiner 130 illustrated in FIGS. 1A-B, and to an HOE. In an example, the SLM 1710 and the light source 1740 are coupled to a controller, such as the controllers 160 illustrated in FIGS. 1A-B.

The term "couple" is used throughout the specification. The term may cover connections, communications, or signal paths that enable a functional relationship consistent with this description. For example, if device A generates a signal to control device B to perform an action, in a first example device A is coupled to device B, or in a second example device A is coupled to device B through intervening component C if intervening component C does not substantially alter the functional relationship between device A and device B such that device B is controlled by device A via the control signal generated by device A.

A device that is "configured to" perform a task or function may be configured (e.g., programmed and/or hardwired) at a time of manufacturing by a manufacturer to perform the function and/or may be configurable (or re-configurable) by a user after manufacturing to perform the function and/or other additional or alternative functions. The configuring may be through firmware and/or software programming of the device, through a construction and/or layout of hardware components and interconnections of the device, or a combination thereof.

A system or device that is described herein as including certain components may instead be adapted to be coupled to those components to form the described structure, device, or apparatus. For example, an apparatus described as including one or more devices (such as PLMs, FLCs or light sources), one or more optical elements (such as lenses), and/or one or more electronic components (such as controllers, processors, or memories) may instead have at least some of the components integrated into a single component which is adapted to be coupled to the remaining components either at a time of manufacture or after a time of manufacture, for example, by an end-user and/or a third-party.

While certain components may be described herein as being of a particular process technology, these components may be exchanged for components of other process technologies. Devices described herein are reconfigurable to include the replaced components to provide functionality at least partially similar to functionality available prior to the component replacement.

Unless otherwise stated, "about," "approximately," or "substantially" preceding a value means +/−10 percent of the stated value. Modifications are possible in the described examples, and other examples are possible within the scope of the claims.

What is claimed is:
1. An apparatus comprising:
   a light source;
   freeform optics configured to optically couple to the light source;

a spatial light modulator (SLM) configured to optically couple to the freeform optics;

a prism configured to optically to the freeform optics and the SLM;

eyepiece optics configured to optically couple to the prism; and at least one of:

a cover prism configured to optically couple to the freeform optics and the prism, and a cover glass configured to optically couple the prims and the SLM.

2. The apparatus of claim 1, further comprising a lens configured to optically to the freeform optics and the prism.

3. The apparatus of claim 1, further comprising an optical combiner configured to optically couple to the eyepiece optics.

4. The apparatus of claim 1, further comprising a controller configured to be coupled to the light source and to the SLM.

5. An apparatus comprising:

a light source array;

a lens array configured to optically couple to the light source array;

a spatial light modulator (SLM) configured to optically couple to the lens array;

a prism operably disposed between the lens array and the SLM;

eyepiece optics configured to optically couple to the prism; and a cover prism configured to optically couple to the lens array and the prism.

6. The apparatus of claim 5, wherein the light source array is a mini light emitting diode (LED) array, a microLED array, a laser diode array, or a fiber light source array.

7. The apparatus of claim 5, wherein respective light sources of the light source array are configured to optically couple to corresponding lenses of the lens array.

8. The apparatus of claim 5, further comprising a controller configured to be coupled to the light source array and to the SLM, wherein the controller is configured to turn off a first light source of the light source array while turning on a second light source of the light source array.

9. The apparatus of claim 5, wherein the eyepiece optics comprises a lens cemented to the prism.

10. The apparatus of claim 5, further comprising an optical combiner configured to optically couple to the eyepiece optics.

11. The apparatus of claim 5, wherein the prism is a reverse total internal reflection (RTIR) prism.

12. A wearable device comprising:

a light source;

a prism;

freeform optics operably disposed between the light source and the prism;

optical elements configured to optically couple to the prism;

a spatial light modulator (SLM) configured to optically couple to the prism;

an optical combiner configured to optically couple to the optical elements; and a holographic optical element configured to optically couple to the optical combiner.

13. The wearable device of claim 12, wherein the optical combiner is on a lens of the wearable device, and the light source, the prism, the freeform optics, the optical elements, and the SLM at a temple of the wearable device.

14. The wearable device of claim 12, further comprising a lens configured to optically couple to the freeform optics and the prism.

15. The wearable device of claim 12, further comprising a cover prism configured to optically couple to the freeform optics and the prism.

16. The wearable device of claim 12, further comprising cover glass configured to optically couple to the prism and the SLM.

* * * * *